US012766756B2

(12) United States Patent
Czapar

(10) Patent No.: US 12,766,756 B2
(45) Date of Patent: Oct. 20, 2026

(54) PLANING APPARATUS

(71) Applicant: Made by Matt, LLC, Larkspur, CA (US)

(72) Inventor: Matthew George Czapar, Larkspur, CA (US)

(73) Assignee: Made by Matt, LLC, Larkspur, CA (US)

( * ) Notice: Subject to any disclaimer, the term of this patent is extended or adjusted under 35 U.S.C. 154(b) by 217 days.

(21) Appl. No.: 18/818,166

(22) Filed: Aug. 28, 2024

(65) Prior Publication Data

US 2025/0073947 A1 Mar. 6, 2025

Related U.S. Application Data

(60) Provisional application No. 63/580,017, filed on Sep. 1, 2023.

(51) Int. Cl.
*B27C 1/14* (2006.01)
*B27C 1/00* (2006.01)

(52) U.S. Cl.
CPC ................ *B27C 1/002* (2013.01); *B27C 1/14* (2013.01)

(58) Field of Classification Search
CPC .. B27C 9/005; B27C 9/02; B27C 5/02; B27C 5/06; B27C 1/02; B27C 1/14; B23Q 9/0007; B23Q 9/0014
See application file for complete search history.

(56) References Cited

U.S. PATENT DOCUMENTS 6,926,094 B2 * 8/2005 Arntson .................. B23B 39/18 173/32
10,315,255 B2 * 6/2019 Albert ...................... B23B 39/14
11,014,208 B2 * 5/2021 Trifoni ................. G05B 19/409

OTHER PUBLICATIONS

Desktop CNC, Laguna Tools, 4 pages, Accessed Online on Jun. 21, 2023, https://lagunatools.com/industrial/desktop-cnc/.
Genmitsu CNC Router Machine 4040-PRO for Woodworking Metal Acrylic Cutting Milling, Genmitsu-Amazon, 12 pages, Accessed Online on Jul. 21, 2023, https://www.amazon.com/gp/product/BOBKSJJS34/ref=ewc_pr_img_1?smid=A1CJB5SY19X4XC&psc=1.
How to plane rough cut wood without a thickness planer. How to build a planer router sled (Video), Tool Teardowns, May 24, 2021, Accessed Online on Jul. 21, 2023, https://www.youtube.com/watch?v=xInjFS26kVc.

(Continued)

*Primary Examiner* — Matthew Katcoff
(74) *Attorney, Agent, or Firm* — MLO, a professional corp.

(57) ABSTRACT

An apparatus includes a carriage, and a first member and a second member coupled to the carriage. The first and second member each have rollers positioned to freely roll along a support and move the carriage. A first set of rollers are positioned in a horizontal plane and a second set of rollers are positioned in a vertical plane. A bracket is coupled to the carriage and configured to hold a cutting tool. The bracket is configured to move along an X-axis and a Y-axis. A plurality of actuators is configured to move the bracket along the X-axis and the Y-axis. Each sensor of a plurality of sensors is configured to generate signals comprising the position of the apparatus. A controller is configured to receive the signals from the sensors and data. The controller executes instructions for controlling movement of the bracket based on the signals and the data.

20 Claims, 19 Drawing Sheets

(56) References Cited

OTHER PUBLICATIONS

MB100 SlabMizer Slab Flattening Mill, Wood-Mizer LLC, 11 pages, Accessed Online on Jun. 21, 2023. https://woodmizer.com/Store/Shop/Sawmill-Options/mb100-slabmizer-slab-flattener.

Thickness Planing Live Edge Slab Wood (Video), Expedition Outbound, Oct. 9, 2011, Accessed Online on Jul. 21, 2023, https://www.youtube.com/watch?v=eUmhNGH99sc.

VEVOR Router Sled, VEVOR-Amazon, 9 pages, Accessed Online on Jul. 21, 2023, https://www.amazon.com/vevor-woodworking-function-portable-flattening/dp/b09t9psrzd/ref=asc_df_b09t9psrzd?tag.

Woodpeckers Slab Flattening Mill, Woodpeckers, 5 pages, Accessed Online on Jun. 21, 2023, https://www.woodpeck.com/woodpeckers-slab-flattening-mill.html.

* cited by examiner

PLANING APPARATUS

RELATED APPLICATIONS

This application claims priority to U.S. Provisional Patent Application No. 63/580,017 filed on Sep. 1, 2023, which is hereby incorporated by reference in full.

BACKGROUND

In today's diverse marketplace, planing devices are used in various industries and Do-It-Yourself (DIY) projects alike. These devices are designed to facilitate material removal and surface flattening operations on wood, metal, plastic, and other materials. Woodworking is a popular hobby, and planing devices are essential for transforming slabs of lumber into aesthetically pleasing pieces such as furniture. These tools come in a variety of forms, from handheld manual or electric planers ideal for smaller projects by individuals or small shops to robust, automated planing machines designed for large-scale industrial applications.

Using handheld manual planing devices effectively requires considerable skill and technique. Achieving smooth, consistent cuts and avoiding mistakes demands practice and experience. Maintaining a consistent cutting depth across the workpiece can be challenging, often resulting in uneven cuts, especially on larger or more intricate projects. The devices have limitations in precision and generally involve a slow process, leading to user fatigue from holding and maneuvering the tool.

Automated planar machines such as a computer numerical controlled (CNC) machine have exceptional precision and accuracy in three dimensions such as in the X-axis, Y-axis and Z-axis. However, CNC machines are very expensive and require a significant amount of space, both for the machine itself and the surrounding area needed for material handling and workspace. Setting up, learning to program and operating a CNC machine involves assembling the machine, configuring the appropriate software, designing projects, creating toolpaths, and generating code. This process can be time-consuming and complex with a steep learning curve. Additionally, CNC machines require regular maintenance, such as cleaning, lubricating, and occasional calibration, to ensure the accuracy and performance. Overall, CNC machines are impractical to own for the individual hobbyists or small shops due to their cost, space requirements, and the complexity of their operation and maintenance.

There exists a desire among woodworking enthusiasts for a compact, quick-to-set-up, and cost-effective devices suitable for the home or small shop use. Such a device should be capable of planing wood with consistent cuts and require minimal effort by the user.

SUMMARY

An apparatus for planing is disclosed. The apparatus includes a carriage having a first end opposite a second end. A first member is coupled to the first end of the carriage opposite a second member coupled to the second end of the carriage. The first member and the second member each having a plurality of rollers positioned to freely roll along a support and move the carriage relative to the support. A first set of rollers of the plurality of rollers are positioned in a horizontal plane and a second set of rollers of the plurality of rollers are positioned in a vertical plane. A bracket is coupled to the carriage and configured to hold a cutting tool for contacting a workpiece. The bracket is configured to move along an X-axis and a Y-axis. A plurality of actuators is operatively connected to the bracket and configured to move the bracket along the X-axis and the Y-axis. Each sensor of a plurality of sensors is in communication with the controller and configured to generate signals comprising the position of the apparatus. A controller is configured to receive the signals from the plurality of sensors and data. The controller executes instructions for controlling the movement of the bracket based on the signals and the data.

An apparatus for planing is disclosed. The apparatus includes a carriage. A bracket is slidably coupled to the carriage. The bracket is operatively connected to a plurality of actuators and configured to move along an X-axis and a Y-axis. A plurality of rollers is positioned to freely roll along a support and move the bracket relative to the support. A first set of rollers of the plurality of rollers are positioned in a horizontal plane and a second set of rollers of the plurality of rollers are positioned in a vertical plane. The plurality of rollers is configured to be replaceable with a second plurality of rollers that has a different material property and/or profile from the plurality of rollers. A controller is configured to execute instructions for controlling the movement of the bracket.

DETAILED DESCRIPTION

Figure 1:
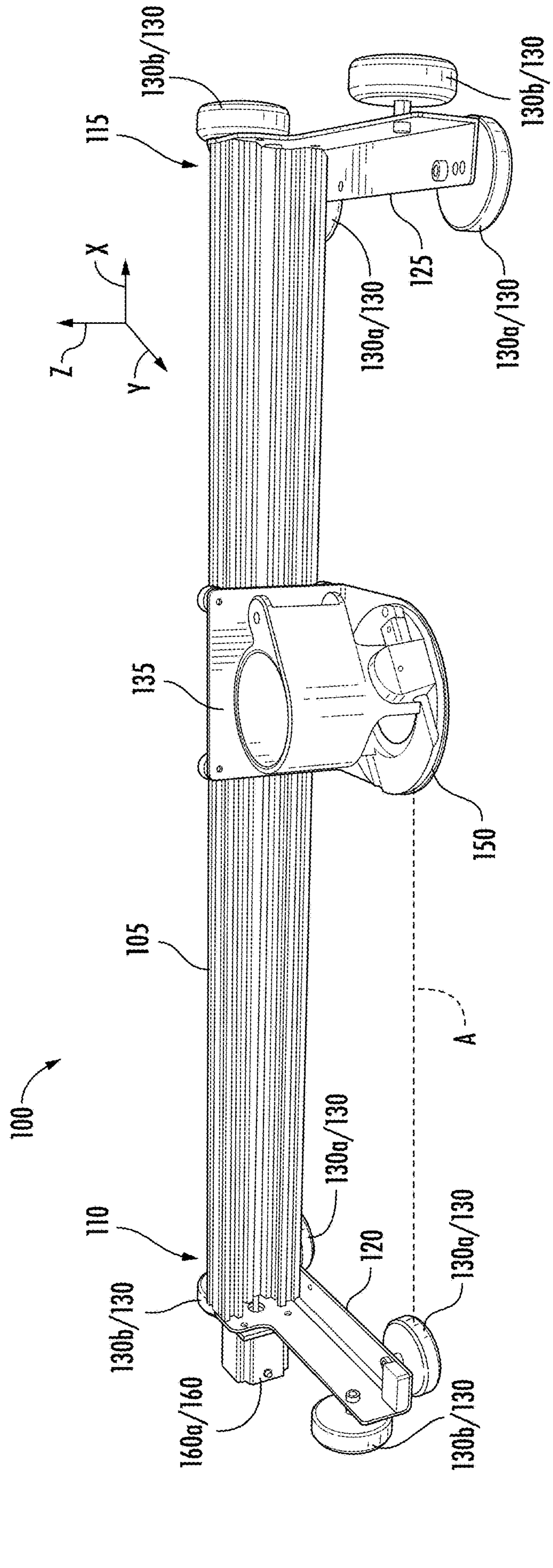
FIG. 1 is a front perspective view of the apparatus for planing a workpiece, in accordance with some embodiments.

The present embodiments provide a compact, lightweight, easy to set-up, inexpensive, motorized apparatus that planes a workpiece with minimal intervention from the user. The present embodiments strike a balance between cost and precision to ensure both affordability and a level of quality for home and small shop use. The apparatus monitors data during planing then adjusts parameters to manage the dulling of the cutting tool and enhance the quality of the finish. The automation and accuracy of the apparatus is advantageous over manual devices, ensuring a consistent cutting depth crucial for the planing process. The present apparatus also overcomes the challenges posed by varying user skill levels and effectively reduces user fatigue.

To minimize costs, in some embodiments, the apparatus utilizes low-cost components such as magnet sensors to restrict or control the linear movement of the apparatus while providing ample accuracy. Direct Current (DC) motors are utilized in some embodiments over more expensive power sources to provide a practical solution that aligns with budget constraints. While other power sources might offer advanced features, DC motors have an ease of integration and maintenance with practicality and efficiency which outweighs the need for more elaborate options. The apparatus is compatible with standard household electrical systems such as operating on 110 volts, therefore not requiring any specialized electrical setup.

The apparatus can be used with cutting tools (e.g., routers) from standard manufacturers by mounting the cutting tool into the bracket of the apparatus. The apparatus planes a workpiece by removing material at a specified depth ensuring precise control of vertical accuracy. The present embodiments manage the precision within the Z-axis (e.g., vertical dimension) by alignment with the manufacturer's manual height adjustment for the cutting tool. By prioritizing precision in the Z-axis, resources can be optimized for specific requirements without unnecessary complexity in multiple dimensions. This is counterintuitive because other automated planing machines, such as a CNC machine, prioritize precision and achieve remarkable accuracy across the X, Y, and Z dimensions through intricate components, precise motor adjustments, and computer-guided instructions.

The apparatus is designed to be both compact and lightweight, allowing a single user to easily lift and maneuver it. In some embodiments, the apparatus is 19 lb to 21 lb. This advantageous feature enables convenient storage options for a DIY enthusiast's home or small shop, such as by hanging the apparatus on a bracket on a wall. To set up the apparatus for a project, the apparatus is positioned on a support (e.g., a wooden board supplied by the user) such that rollers (e.g., wheels) of the apparatus freely roll along an upper surface of the support. Side rollers of the apparatus are positioned to freely roll along an inner surface of the support. The length of the support can vary, and in some embodiments, sensors (e.g., magnetic, optical, electrical, or other) are used to govern the travel of the apparatus along the support. A cutting tool such as a router with a blade is positioned in a bracket of the apparatus, and the cutting area is below any portion of the apparatus.

Conventional solutions, such as CNC machines, are limited by a fixed maximum work area, determined by the length and width of their rails. Due to their size and complexity, CNC machines are not easily relocated or repositioned, requiring the width of the workpiece to be narrower than that of the machine's fixture. Embodiments herein present a versatile configuration that uses movable sensors, such as magnets and magnet sensors attached to the apparatus, allowing users to customize the travel of the apparatus and enabling the cutting area to be directly beneath or below the apparatus. This design allows the apparatus to plane a diverse range of workpiece sizes, extending to unlimited width and length possibilities. For example, the apparatus moves along the support, enabling the cutting to be below the apparatus, thus eliminating size limitations imposed by traditional fixtures. In some embodiments, for large workpieces, the apparatus can plane one portion of the workpiece then be easily repositioned to plane the remainder, ensuring comprehensive coverage regardless of the workpiece's size.

The user can set up supports to accommodate the size and working area of the workpiece as needed, and the apparatus is placed onto the supports. In one example scenario, the user may set up a pair of parallel supports bordering opposite sides of the desired working area, with the apparatus positioned perpendicularly across the supports. In another example scenario, a second pair of supports may be placed orthogonally on a first pair of supports (e.g., see FIG. 11) to handle a working area that exceeds the size of the apparatus or if only a portion of the workpiece is desired to be cut or planed. Because the cutting area of the apparatus is designed to be below its bottom plane, the achievable working area is not limited by the size of the planing apparatus. Instead, the apparatus can be mounted onto supports arranged by the user as needed. This configuration enables an accessible cutting area that extends beyond the bottom plane of the apparatus, providing flexibility to work on larger or irregularly sized workpieces.

The apparatus can plane a workpiece of various shapes, including square, rectangular, circular, oval, triangular, hexagon, L-shaped, S-curved, among others. The apparatus is versatile to handle materials such as wood, metal, plastic, and other materials. In operation, the apparatus travels along a workpiece, cutting or planing it as it progresses. For example, the apparatus begins at a first end of the workpiece and performs a forward primary cut along a Y-axis of the workpiece. After the apparatus travels the entire length of the workpiece in the Y-axis to the second end of the workpiece, the apparatus may reverse directions and execute a rearward finishing cut along the same Y-axis or path toward the first end of the workpiece, returning to the starting point. Once back at the first end of the workpiece, the apparatus incrementally advances in the X-axis to the next cutting position. The forward and rearward cuts in the Y-axis are repeated at this new X-axis position. The repetition of subsequent cycles continue until the entire workpiece is planed. The two-pass cut (e.g., forward cut followed by a rearward finishing cut) is a deliberate technique ensuring a smoother final surface, whereas a single-pass cut may result in a slightly rougher finish. In some embodiments, a user may opt for single-pass cuts depending on the desired finish and specific requirements of the project.

FIG. 1 is a front perspective view of the apparatus for planing a workpiece, in accordance with some embodiments. The apparatus 100 includes a carriage 105 having a first end 110 opposite a second end 115. The carriage 105 extends along an X-axis. A first member 120 is coupled to the first end 110 of the carriage 105 opposite a second member 125 coupled to the second end 115 of the carriage 105. The first member 120 and the second member 125 are generally perpendicular to the carriage 105, with each extending along a Y-axis.

Figure 2:
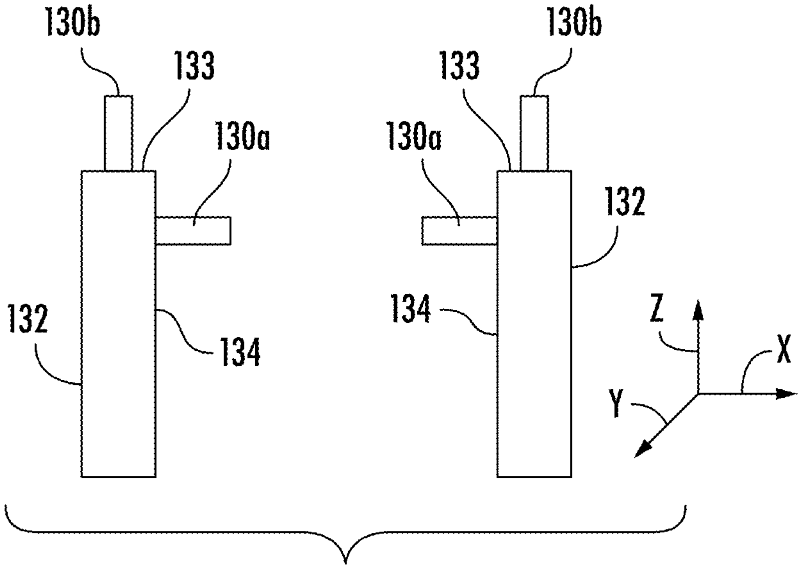
FIG. 2 shows a schematic of a front view (i.e., end view) of a support with a plurality of rollers, in accordance with some embodiments.
Figure 10:
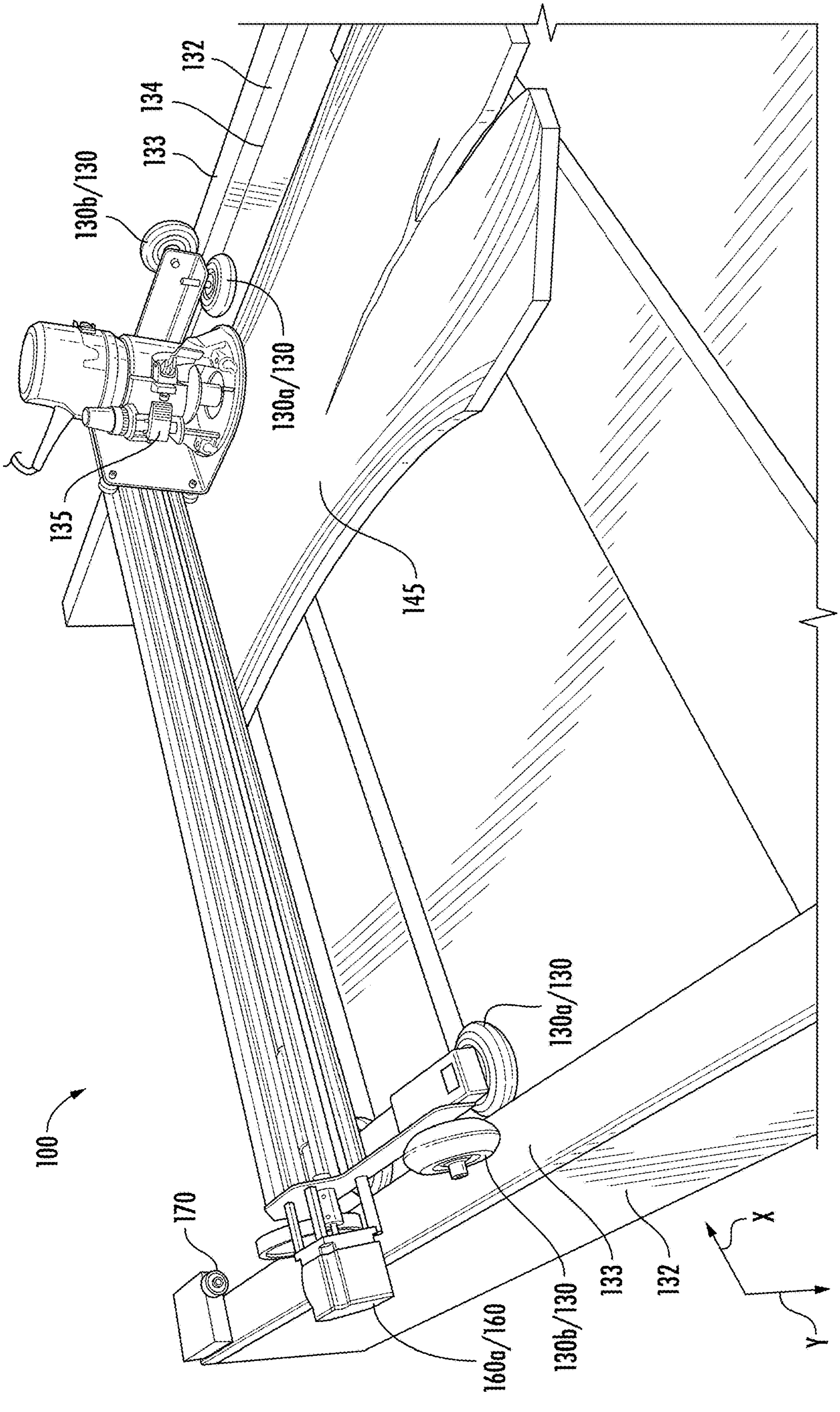
FIGS. 10 and 11 are perspective views of the apparatus during planing a workpiece, both in accordance with some embodiments.
Figure 11:
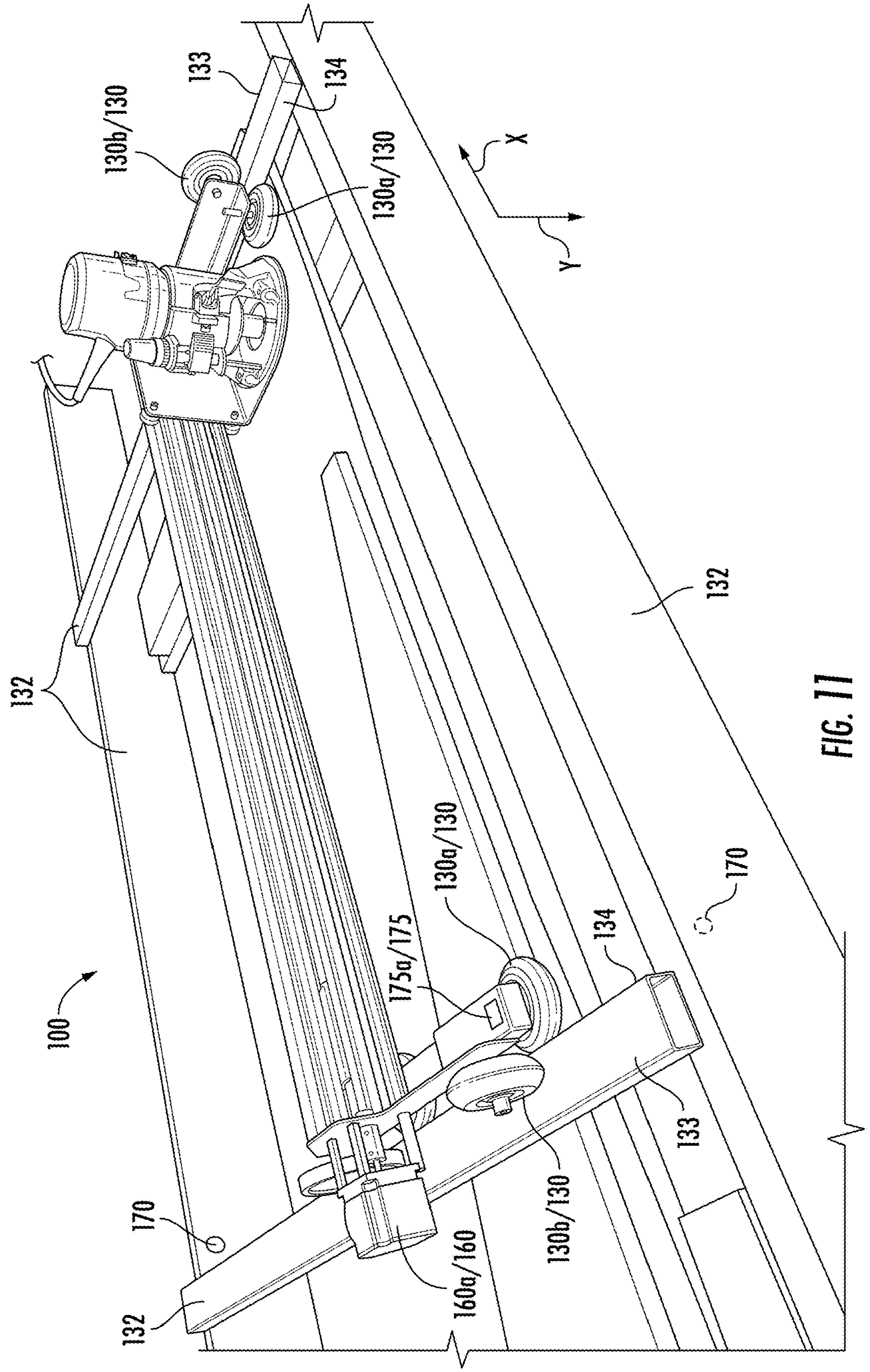

The first member 120 and the second member 125 each have a plurality of rollers 130 coupled thereto, and the plurality of rollers 130 are positioned to freely roll along a support 132 (shown in FIGS. 10 and 11). FIG. 2 shows a schematic of a front view (i.e., end view) of a support with a plurality of rollers 130, in accordance with some embodiments. The support 132 includes a top surface 133 and an interior surface 134. A first set of rollers 130*a* of the plurality of rollers 130 are positioned in a horizontal plane and designed to freely roll along an interior surface 134 of the support 132. A second set of rollers 130*b* of the plurality of rollers 130 are positioned in a vertical plane and designed to freely roll on a top surface 133 of the support 132. The combination of the horizontally mounted rollers 130*a* and the vertically mounted rollers 130*b* aids in the stability of the apparatus 100 while in operation. Moreover, the apparatus 100 is not rigidly attached to the support 132. This means that the plurality of rollers 130 have flexibility and movement. The plurality of rollers 130 roll along the support 132 and is not fixed which allows for a degree of adjustment, separation, or change in position.

Figure 3A:
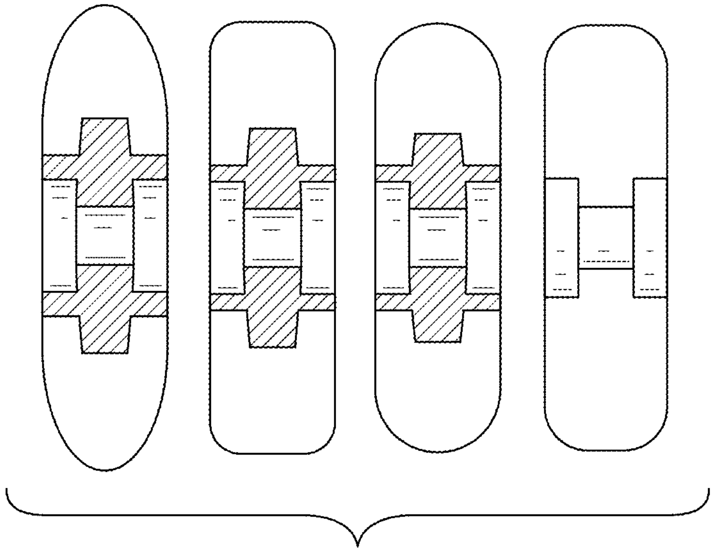
FIG. 3A is a schematic of example profiles of rollers, as known in the art.
Figure 3B:
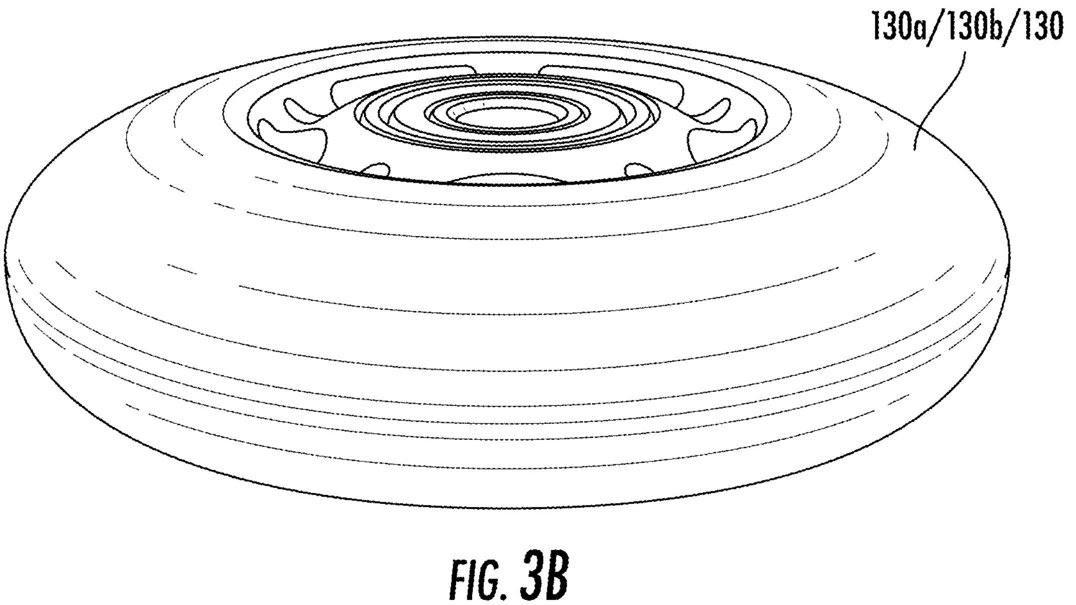
FIGS. 3B and 3C are a perspective view and a side view of an example roller of the plurality of rollers, both in accordance with some embodiments.
Figure 3C:
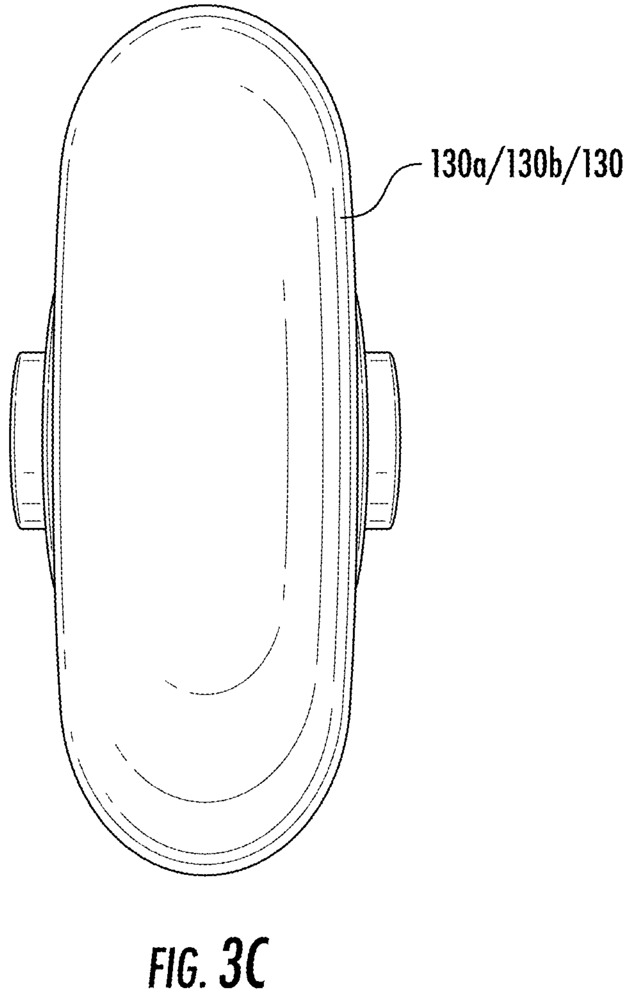

FIG. 3A is a schematic of example profiles of rollers 130, as known in the art. The first set of rollers 130*a* and the second set of rollers 130*b* of the plurality of rollers 130 have a cross-sectional profile that determines an amount of the roller that contacts the support 132 during rolling. The specific shape of the profile, including curvature of the wheel's edges, influences the roller's grip, speed, and stability, thereby impacting the overall performance and functionality of the apparatus 100. The curvature of the wheel edges can be described by the radius of curvature, which refers to how rounded or flat the wheel is. For example, a wheel with a larger radius of curvature will have a flatter profile, leading to more contact with the ground, while a smaller radius of curvature will result in a more rounded profile, leading to less ground contact. The rollers shown in FIG. 3A each have a different cross-sectional profile (e.g., radius of curvature) from one another. FIGS. 3B and 3C are a perspective view and a side view of an example roller of the plurality of rollers 130, both in accordance with some embodiments. Each roller 130*a* and 130*b* of the plurality of rollers 130 may have a rounded profile so that a contact surface of the roller 130*a*/130*b* to the support 132 is minimal such as 1.5 mm to 3 mm, or 2 mm. The roller 130*a*/130*b* may be an inexpensive wheel such as an in-line skate wheel (e.g., rollerblade style wheel), skateboard wheel, scooter wheel, luggage wheel, among others, for a cost-effective solution.

In some embodiments, the rounded profile of rollers 130*a* and 130*b* enable them to effectively push accumulated sawdust debris out of the way as they travel along the support 132, particularly in the case of vertically mounted roller 130*b*. This feature keeps the support 132 clear of sawdust, helping to maintain a stable and level cut while planing a workpiece. Without this design, the roller 130*b* may "bounce" over small piles of accumulated sawdust, causing uneven cuts in the workpiece during operation.

Returning to FIG. 1, a bracket 135 is coupled to the carriage 105 and configured to hold a tool such as a cutting tool 140 (shown in FIGS. 7-9 and 12) for contacting a workpiece 145. In some embodiments, the cutting tool 140 is a router with a router bit. The bracket 135 is configured to move along both the X-axis and Y-axis and has a bottom surface 150. The cutting tool 140 generally extends below the bottom surface 150 of the bracket 135. During the movement of the bracket 135, the bottom surface 150 is aligned with a centerline the first set of rollers 130*a* in the horizontal plane (indicated by broken line A in FIG. 1). Additionally, the bracket 135 is designed as a universal holder, providing the user with the flexibility to use their choice of tool with the apparatus 100.

Figure 4A:
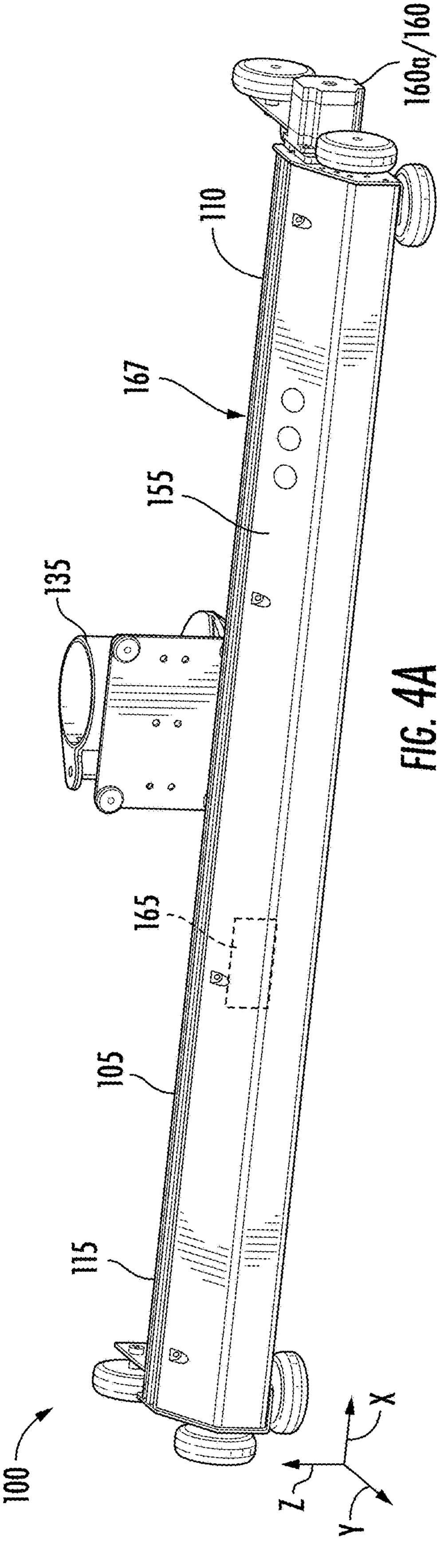
FIG. 4A is a rear perspective view of the apparatus with a housing, in accordance with some embodiments.
Figure 4B:
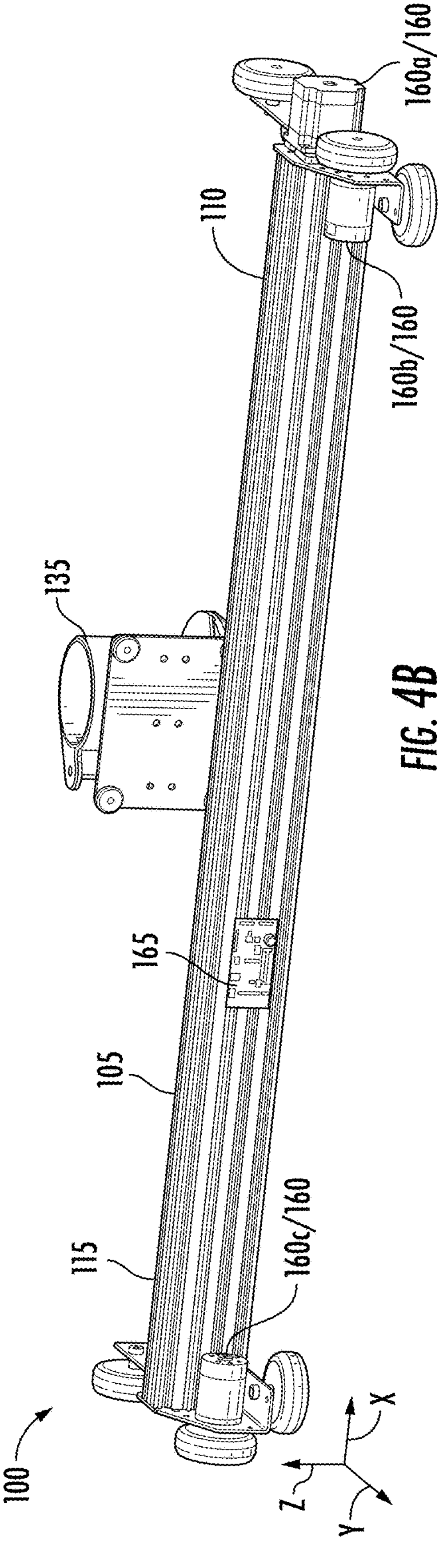
FIG. 4B is a rear perspective view of the apparatus with the housing removed, in accordance with some embodiments.

FIG. 4A is a rear perspective view of the apparatus 100 with a housing, and FIG. 4B is a rear perspective view of the apparatus 100 with the housing removed, both in accordance with some embodiments. A housing 155 covers the carriage 105 for protection from debris such as sawdust. A plurality of actuators 160 may be coupled to the carriage 105 to provide the power for moving the apparatus 100 including movement of bracket 135, in the horizontal plane. For example, actuator 160*a* and 160*b* of the plurality of actuators 160 may be coupled on the first end 110 of the carriage 105, and actuator 160*c* of the plurality of actuators 160 may be coupled on the second end 115 of the carriage 105. In other embodiments, the plurality of actuators 160 may be coupled to other areas of the carriage 105, the first member 120, the second member 125 or positioned remotely from the apparatus 100.

The plurality of actuators 160 is operatively connected to the bracket 135 and configured to move the bracket 135 along the X-axis and the Y-axis. The actuator 160*a*, which may be a stepper motor, controls the movement in the X-axis or "side-to-side" motion of the bracket 135 along the carriage 105. In some embodiments, this is achieved by the stepper motor rotating a threaded rod coupled to the carriage 105. In some embodiments, the actuators 160*b* and 160*c* may be direct current (DC) motors, such as a 24-volt 30 RPM gear motor. These actuators may control the Y-axis direction or "forward-and-rearward" motion of the bracket 135 by moving the apparatus 100 while the plurality of rollers 130 freely roll along the support 132. Assessing the gear ratio was a design consideration for the apparatus 100 to ensure sufficient power for its movement while minimizing the risk of "pulling" and causing unintended gouges on the workpiece surface. In some embodiments, other types of actuators, such as servo motors or stepper motors, may be utilized based on the specific application requirements, offering additional flexibility and precision.

A controller 165 is configured to receive data and execute instructions for controlling the movement of the carriage 105, bracket 135 and plurality of rollers 130 based on the data. The data may include an electrical current supplied to the plurality of actuators 160, such as actuators 160*b* and 160*c*, as well as a duration of time the bracket 135 moves in the horizontal plane. In some embodiments, a mobile device may be used to communicate with the controller 165 via Bluetooth® or Wi-Fi, providing a convenient interface for monitoring and adjusting the apparatus's operation (described in relation to FIG. 9).

In this embodiment, the apparatus 100 includes a set of manually operable buttons 167 on the carriage 105 designed to control the activation and deactivation of the apparatus 100. In this instance, there are three buttons, where each button corresponds to an on command, off command, and a home function allowing the user to exert direct control over the machine's operations. These buttons are strategically positioned to be easily accessible, ensuring that the user can efficiently toggle the machine's functions with minimal effort. When the home button is depressed, the bracket 135 and the carriage 105 each return to their respective home position. In other embodiments, the number of buttons can vary, with fewer or more than three. The on/off function may be integrated into a single button, or additional buttons may be present for functions such as pausing the apparatus 100.

Figure 5:
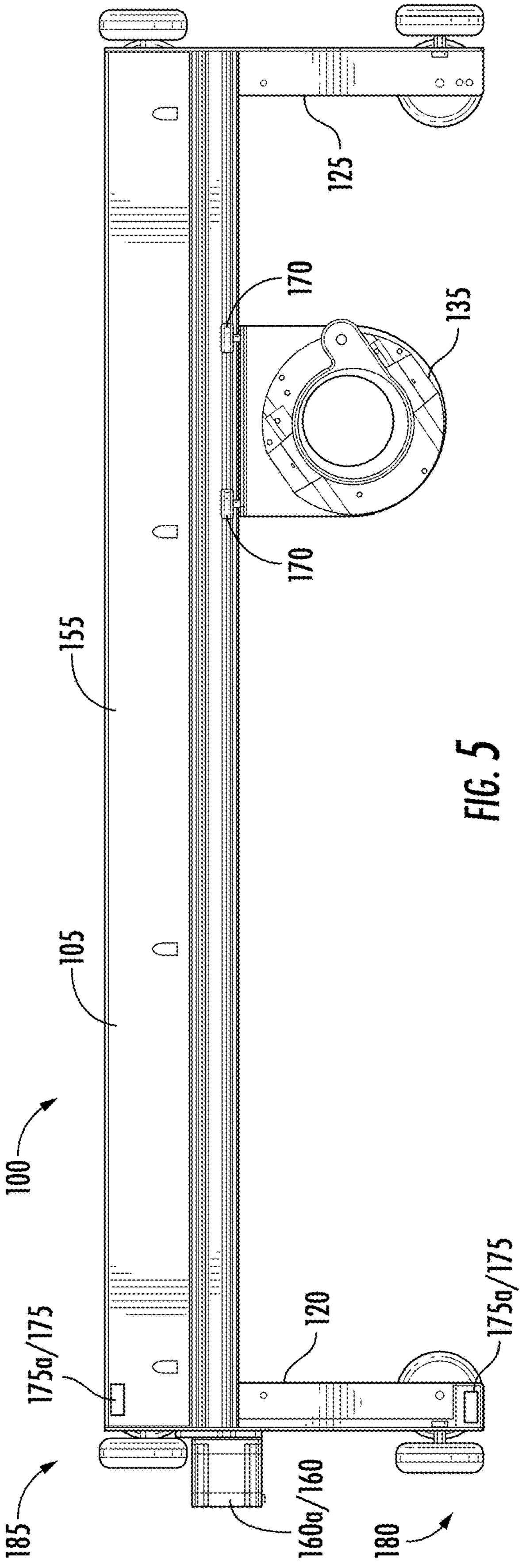
FIG. 5 is a top view of the apparatus for planing a workpiece, in accordance with some embodiments.

FIG. 5 is a top view of the apparatus 100 for planing a workpiece 145, in accordance with some embodiments. The apparatus 100 includes a plurality of sensors in communication with controller 165. In some embodiments, the plurality of sensors are magnet sensors, optical sensors, proximity sensors, mechanical limit switches, among others. The present embodiments illustrate the use of magnet sensors as an example; however, other types of sensors may also be employed.

Magnet sensors, also known as magnetic limit sensors, may be used to restrict or control the linear movement of the apparatus 100. Magnet sensors operate based on the principles of magnetism and include a magnet and a sensor. The magnet is mounted near the end of the desired length of travel by the apparatus 100, and the magnet generates a magnetic field. The sensor is mounted on the apparatus 100 and as the apparatus 100 approaches the magnet, the sensor detects the strength of the magnetic field. At a threshold, the sensor triggers a signal to the controller 165 to limit the linear movement. The signal can be used to slow down the motion of the apparatus 100, stop it entirely, reverse its direction, or activate other safety measures. The magnet sensors control the linear motion of the apparatus 100 in the horizontal plane, along the X-axis and the Y-axis. Additionally, these sensors serve as a safety feature by preventing the apparatus 100 from colliding with the support 132, thereby avoiding potential damage or accidents.

The apparatus 100 includes a plurality of magnet sensors having a plurality of magnets 170 and a plurality of sensors 175 for controlling the linear motion along the Y-axis. In some embodiments, a magnet 170 is coupled to a portion of the support 132 and is configured to generate a magnetic field. For example, the magnet 170 may be coupled on the interior surface 134 of the support 132, facing the apparatus 100 and aligned parallel with the first member 120 (as shown in FIGS. 10 and 11). There may be a magnet 170 at both a first end of the support 132 and a second end of the support 132. These magnets 170 are positioned beyond the workpiece 145 to define a travel distance of the apparatus 100 along the Y-axis.

A plurality of sensors 175 coordinates with the plurality of magnets 170 to control the apparatus 100. In the embodiment depicted, each sensor 175*a* of the plurality of sensors 175 is positioned on the first member 120 such as a sensor 175*a* on a first side 180 of the first member 120. For example, there may be a sensor 175*a* on the first side 180 of the first member 120 (shown near the rollers) and another sensor 175*a* on a second side 185 of the first member 120 (shown at the end of the first member 120 coupled to the carriage 105). This strategic positioning allows the sensors to effectively interact with the magnets 170, ensuring precise control of the apparatus's movement. The plurality of sensors 175 is configured to detect changes in the magnetic field strength caused by movement of the bracket 135. The sensors 175*a* communicate with the controller 165, which receives signals from the sensors 175. Based on these detected changes in magnetic field strength, the controller 165 adjusts the movement of the apparatus 100 in the horizontal plane or along the X-axis and/or the Y-axis. For example, as the sensor 175*a* approaches a magnet 170, the magnetic field strength increases, signaling the controller 165 that the bracket 135 or the carriage 105 is nearing the end of the desired travel distance. The controller 165 can then slow down or stop the movement of the plurality of actuators 160 accordingly.

The embodiments allow the bracket 135 to travel freely without contacting the support 132 or any surrounding objects. For example, the magnets 170 may be strategically positioned to enable the apparatus 100 to move the entire length of the workpiece 145 in one direction, such as the positive Y-axis direction. During this pass, the cutting tool 140 cuts the workpiece 145. Once the interaction between the magnet 170 and sensor 175*a* reaches the threshold of the strength of the magnetic field, the controller 165 reverses the direction of the apparatus 100. This involves controlling the actuators 160 to reverse the direction of the rollers 130, moving the apparatus 100 along the support 132 in the opposite direction, such as along the negative Y-axis. Another cutting pass is then executed by the cutting tool 140 on the workpiece 145.

In some embodiments, the controller 165 may also move the bracket 135 in the X-axis, allowing a new area of the workpiece 145 to be planed before continuing in the opposite Y-axis direction. The apparatus 100 will continue in the negative Y-axis direction until the threshold strength of the magnetic field is again reached through the interaction between magnet 170 and sensor 175*a*. At this point, the controller 165 moves the apparatus 100 in the Y-axis direction and reverses the direction of travel.

Figure 6:
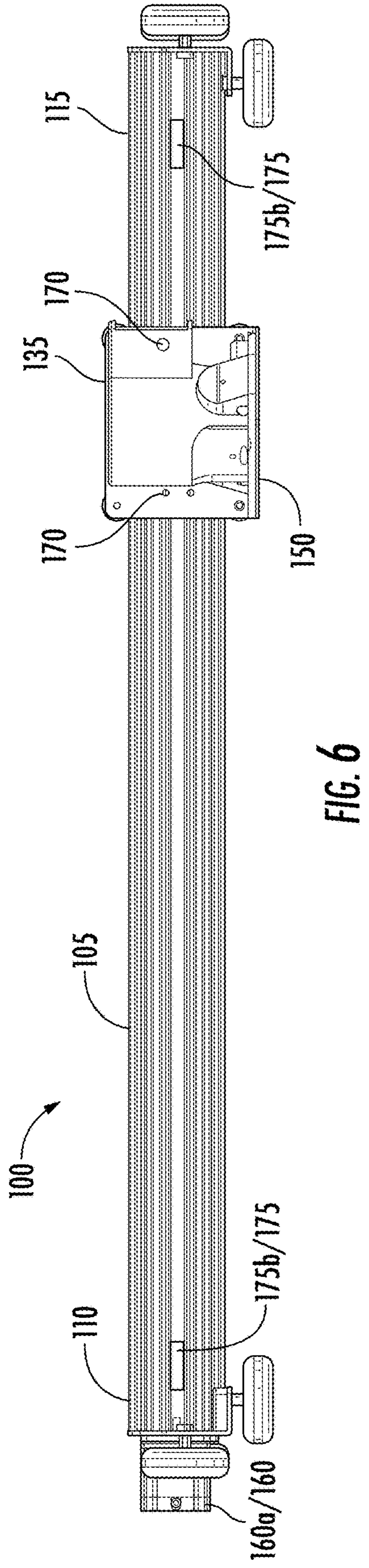
FIG. 6 is a front view of the apparatus for planing a workpiece with the housing removed, in accordance with some embodiments.

The linear motion of the apparatus 100 is also controlled in the X-axis direction by a plurality of magnet sensors. FIG. 6 is a front view of the apparatus 100 for planing a workpiece 145 with the housing 155 removed, in accordance with some embodiments. The apparatus 100 includes a plurality of magnet sensors having a plurality of magnets 170 and a plurality of sensors 175 which operate as described herein. In some embodiments, a magnet 170 is coupled to a portion of the bracket 135 and coordinates with a plurality of sensors 175. Each sensor 175*b* of the plurality of sensors 175 is positioned on the first end 110 and the second end 115 of the carriage 105 respectively. These sensors 175 are configured to detect changes in the strength of the magnetic field caused by movement of the bracket 135.

For example, while the apparatus 100 is moving along the positive X-axis direction and the cutting tool 140 is planing the workpiece 145, the interaction between the magnet 170 and the sensor 175*b* reaches the threshold strength of the magnetic field. At this point, the controller 165 may reverse the direction of the apparatus 100 (e.g., bracket 135) and execute another cutting pass on the workpiece 145. In some embodiments, the controller 165 may also stop the apparatus 100. Essentially, the sensors 175*b* communicate with the controller 165, which then controls the movement of the bracket 135 in the horizontal plane along the X-axis and/or the Y-axis based on the sensor signals or in this example, detected changes in the strength of the magnetic field.

Figure 7A:
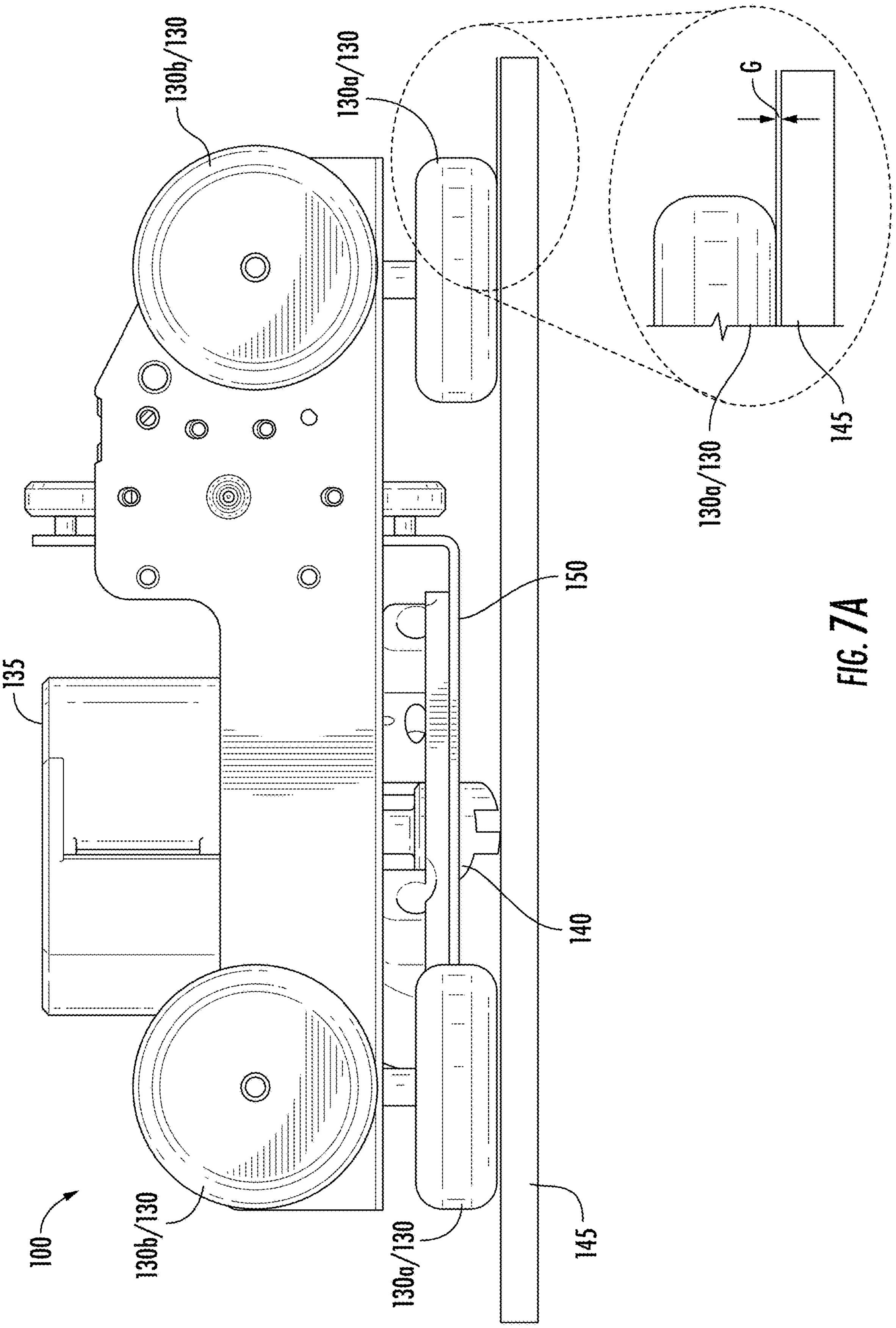
FIGS. 7A-7C are side views of the apparatus with a cutting tool, all in accordance with some embodiments.
Figure 7B:
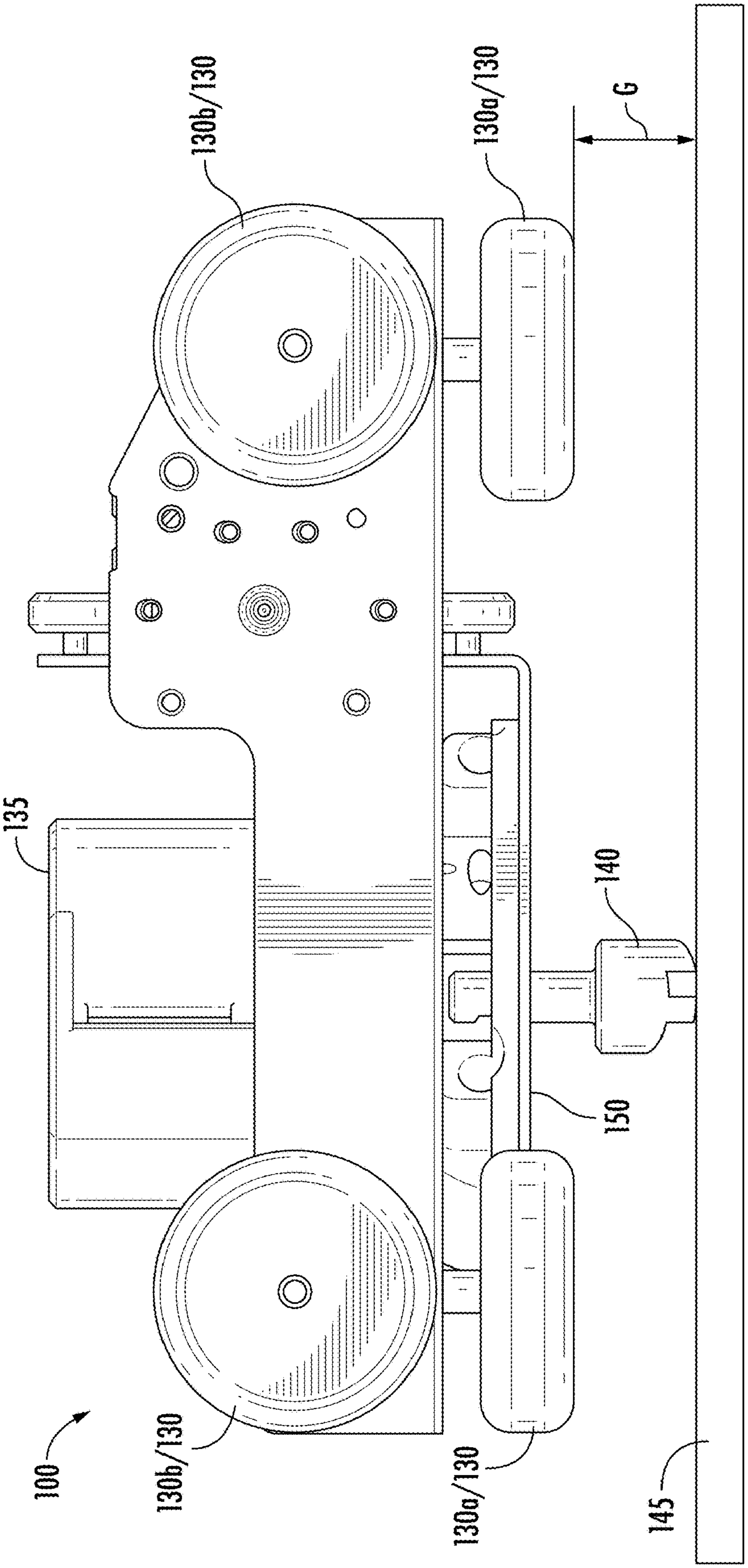
Figure 7C:
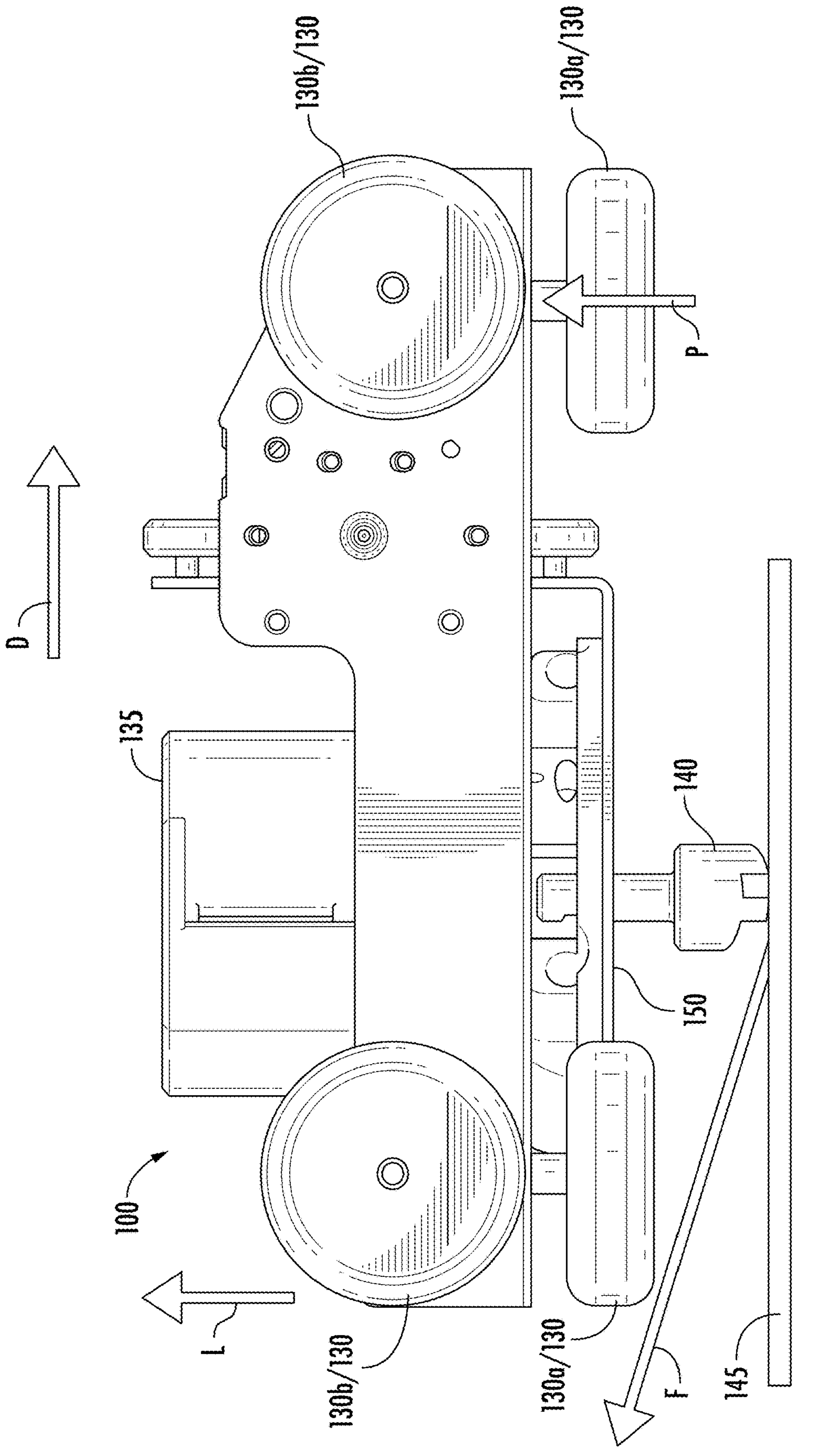

FIGS. 7A-7C are side views of the apparatus 100 with a cutting tool 140, all in accordance with some embodiments. One feature of the apparatus 100 is that the second set of rollers 130*b* are positioned in the vertical plane and designed to freely roll on a top surface 133 of the support 132, while the first set of rollers 130*a* is positioned in the horizontal plane and freely roll on the interior surface 134 of the support 132. During operation, the entire apparatus 100 moves over the workpiece 145 to the plane the top surface of the workpiece 145 while the workpiece 145 remains stationary. The first set of rollers 130*a* is the lowest point of the apparatus 100 and the closest component of the apparatus 100 to the workpiece 145. As shown in FIGS. 7A and 7B, during operation, a distance between the bottom face of the first set of rollers 130*a* (e.g., the edge of the rollers closest to the workpiece 145) and the workpiece 145, may range from 0.5 mm to 30.77 mm or 0.4 mm to 32 mm. This is annotated in FIGS. 7A and 7B and labelled as G. This precise positioning ensures stable and accurate planing of the workpiece 145, establishing the operational zone or cutting plane as beneath the entirety of the apparatus 100. This design allows the workpiece 145 to exceed the apparatus's length and width, enabling effective planing without being constrained by a fixture.

FIG. 7C details example forces created during the operation of the apparatus 100 during a rearward finishing cut. For example, when the direction of the cut is rearward (labelled as arrow D), a force generated at the cutting tool 140 (labelled as arrow F) may cause the trailing side of apparatus 100 to lift during travel (labelled as arrow L), creating a pivot point at the first set of rollers 130*a* and the second set of rollers 130*b* on the leading side of the apparatus 100 (labelled as arrow P). This phenomenon was considered for the design to address situations when the depth of cut is set too deep. The mechanism allows for marginally too deep cuts to automatically adjust to a slightly shallower depth, enabling the remaining material to be removed on the return cut. This design feature allows for deeper passes to be performed more effectively and safely.

Slip force is a force required to overcome friction and cause the rollers 130 to begin moving relative to the support 132. The apparatus 100 is not rigidly coupled to the support 132. Rather, the first set of rollers 130*a* of the plurality of rollers 130 are positioned in a horizontal plane and designed to freely roll along an interior surface 134 of the support 132, and the second set of rollers 130*b* of the plurality of rollers 130 are positioned in a vertical plane and designed to freely roll on a top surface 133 of the support 132. While this design enhances the stability of the apparatus 100 during operation, when the cutting tool 140 encounters resistance-such as when the slip force is high—the plurality of rollers 130 may "slip," resulting in a reduction of the cutting force. The slip force may be calculated by the equation:

$$F_{slip} = \mu_s \times F_n$$

where $F_{slip}$ is the slip force, $\mu_s$ is a coefficient of friction between the roller, such as roller 130*a* or 130*b* of the plurality of rollers 130, and the support 132, and $F_n$ is the normal force, which is the force perpendicular to the surfaces in contact (e.g., the weight of the apparatus 100).

It was discovered that the rollers 130 begin to slip when the applied force exceeds a certain threshold, particularly during deep cuts while planing the workpiece 145. By adjusting the coefficient of friction of the rollers 130, the slip force can be calibrated and modified according to the material properties of the workpiece 145 being planed. This provides greater flexibility in configuring the apparatus 100, allowing the cutting tool 140 to execute a deep cutting pass during forward motion and a shallow finishing pass during rearward motion, thereby optimizing the planing process for both efficiency and quality. The coefficient of friction of the rollers 130 is adjusted by switching out the rollers 130 to accurately tune to how much force is generated forward thereby adjusting when the rollers 130 start to slip. This is a design feature because the apparatus 100 freely moves on the support 132 without being rigidly fixed or coupled to the support 132 or another component. In some embodiments, rollers 130 with a lower coefficient of friction on an oak workpiece may be selected so the rollers 130 purposely slip sooner thus protecting the surface of the workpiece and/or cutting tool 140. In other embodiments, the rollers 130 may be selected to allow the cutting tool 140 to execute a deep cutting pass to remove material of the workpiece 145 quickly with no regard to the protection of the cutting tool 140.

Figure 8A:
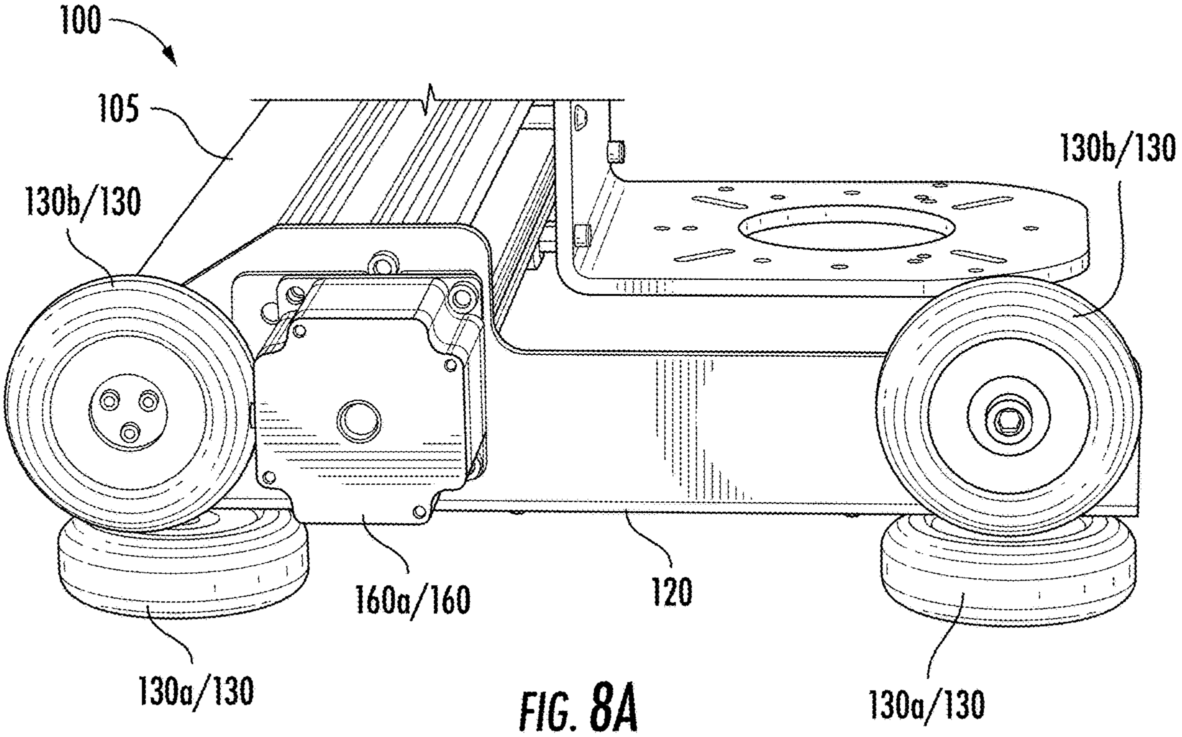
FIGS. 8A and 8B are side perspective views of a portion of the apparatus, both in accordance with some embodiments.
Figure 8B:
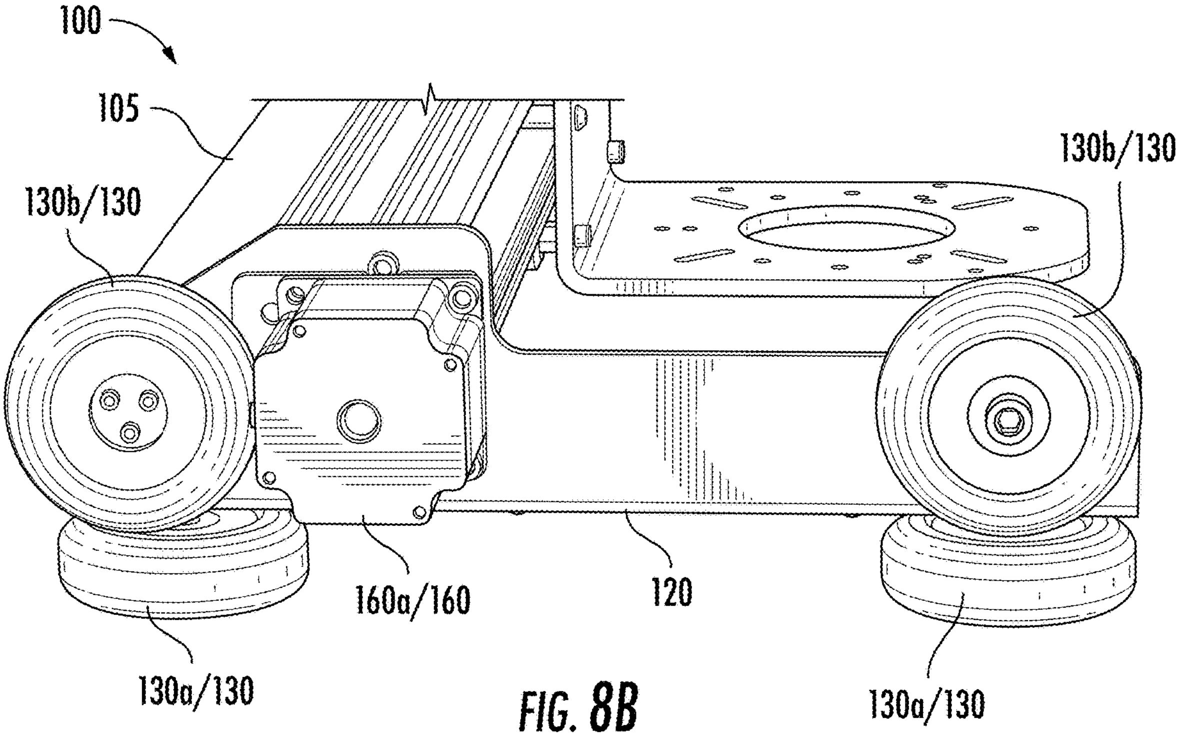

FIGS. 8A and 8B are side perspective views of a portion of the apparatus 100, both in accordance with some embodiments. In an example embodiment shown in FIG. 8A, the rollers 130 are comprised of rubber and the support 132 is comprised of wood. The coefficient of friction is 0.65 and the weight of the apparatus 100 (with cutting tool 140, e.g., router) is 36 lb. Hence, the slip force is 23.4 lb. This configuration is well-suited for planing workpieces 145 made of hard materials and can remove material more quickly. However, it is less effective at preserving the cutting tool 140 (e.g., router bit) and potentially may lead to a poorer finish of the surface of the workpiece 145.

In another example embodiment shown in FIG. 8B, the rollers 130 are comprised of Teflon® and the support 132 are comprised of wood. The coefficient of friction is 0.2 and the weight of the apparatus 100 (with cutting tool 140, e.g., router) such as during operation) is 36 lb. Hence, the slip force 7.2 lb. This configuration may offer better protection for fragile cutting tools 140, such as router bits, and is capable of producing a smoother finish on the surface of the workpiece 145. However, it is more prone to experiencing slowdowns during cutting when the cutting tool 140 becomes bogged down by resistance.

Figure 9:
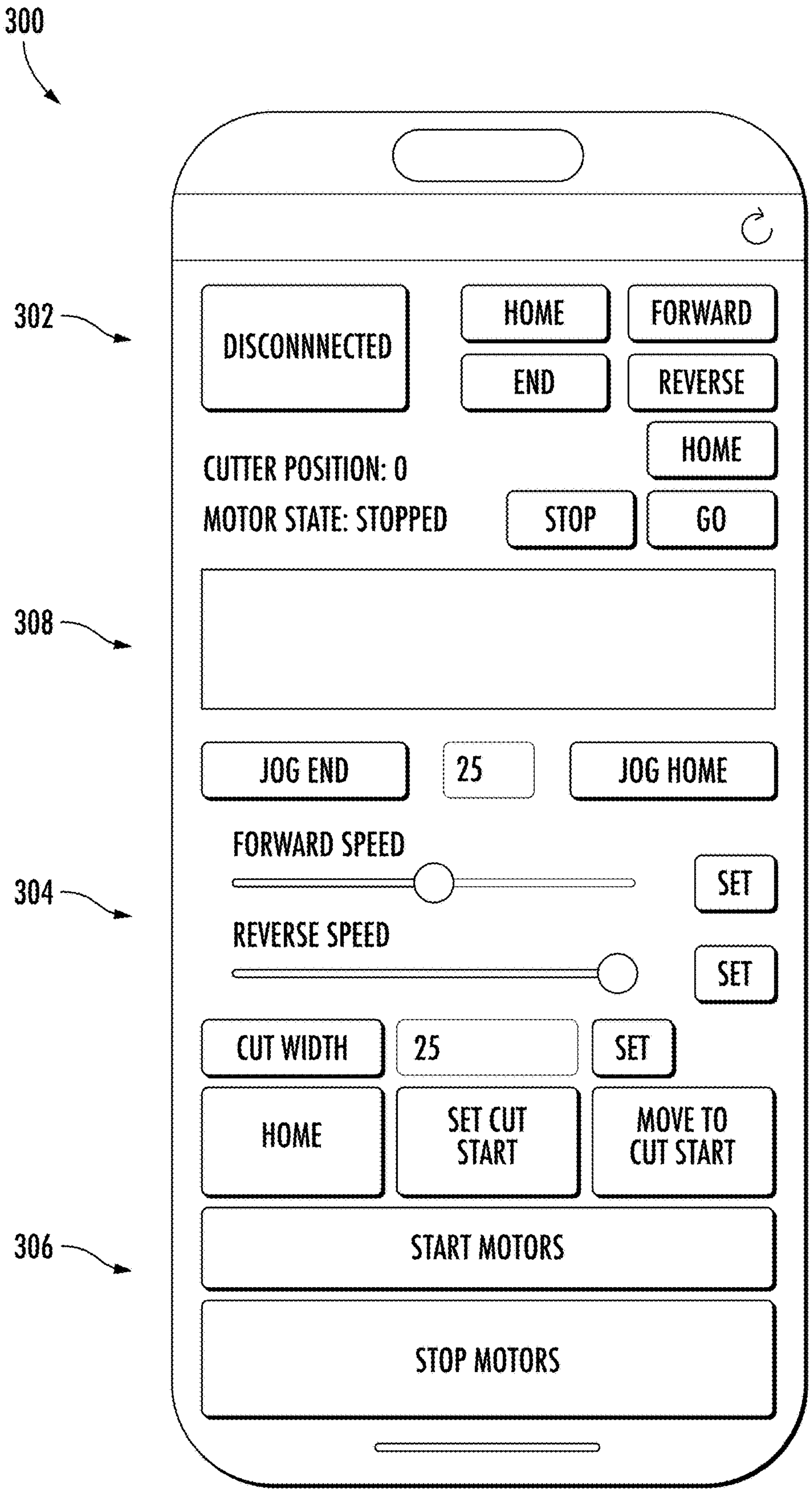
FIG. 9 depicts an example graphical user interface (GUI) for communication with the apparatus, in accordance with some embodiments.

In some embodiments, the user can control the apparatus 100 directly through an app on a connected device by selecting various options within the interface, allowing them to adjust settings, initiate actions, and monitor the device's performance in real time. The controller 165 interfaces with the app on the device to monitor and adjust the operation of the apparatus 100. FIG. 9 depicts an example graphical user interface (GUI) for communication with the apparatus 100, in accordance with some embodiments. The GUI 300 includes a telemetry section 302, which displays the status of the apparatus 100, including tripped end stops, its position in the cutting process, and the overall state of operation. A tuning section 304 allows for setting various parameters, such as speed and cut width. A control section 306 enables the starting and stopping of the motors, setting cut start positions, and returning to those positions as needed. Additionally, a message center 308 displays alerts to the user as described in other sections.

Figure 12:
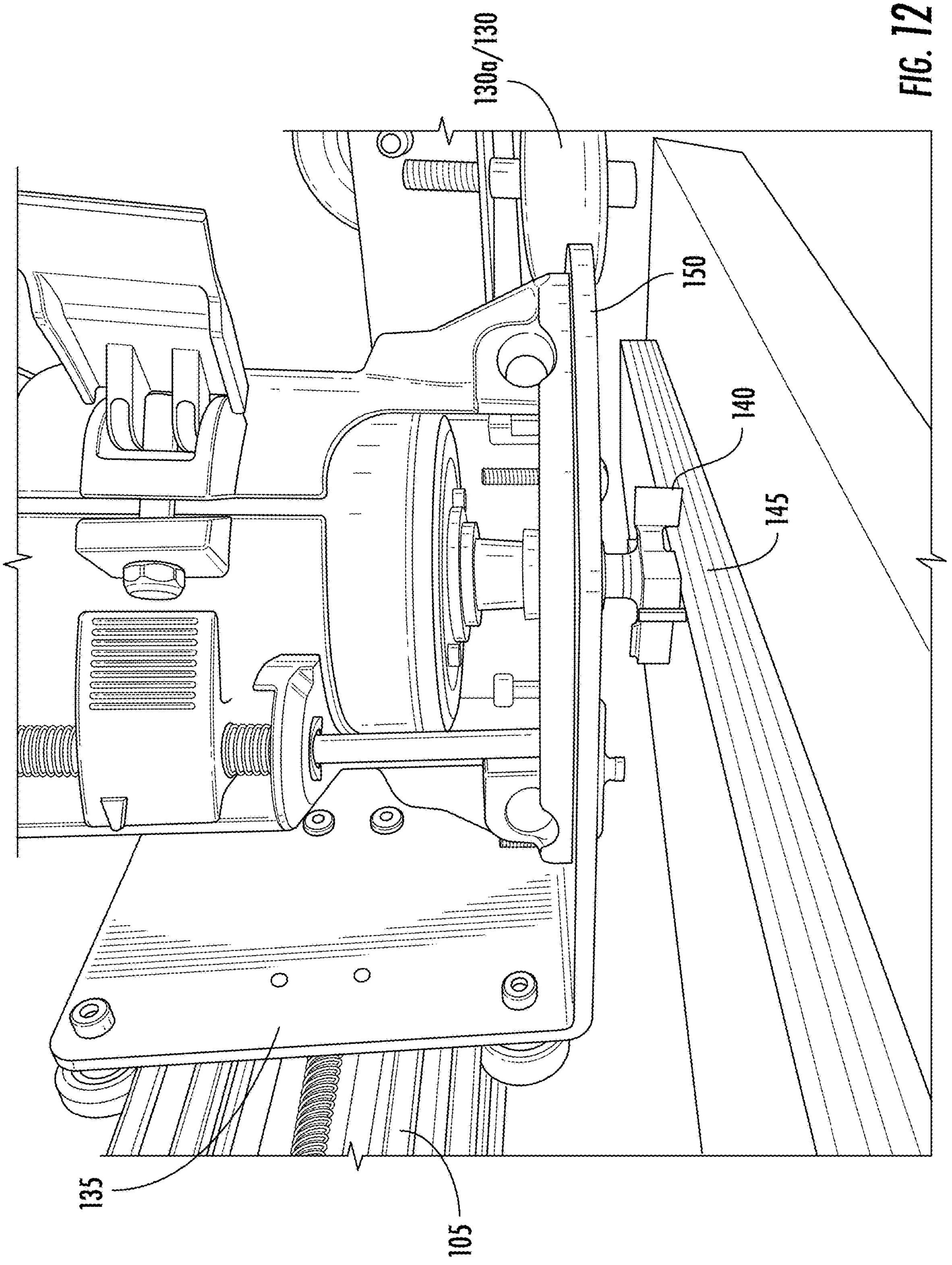
FIG. 12 is a close-up perspective view of the bracket of the apparatus during operation, in accordance with some embodiments.

FIGS. 10 and 11 are perspective views of the apparatus 100 during planing a workpiece 145, and FIG. 12 is a close-up perspective view of the bracket 135 of the apparatus 100 during operation, all in accordance with some embodiments. The set-up of the apparatus 100 on the support 132 is flexible and customizable. The support 132 may include economical alternatives, like a sturdy frame built from two-by-four or two-by-six boards, metal bars (e.g., angle irons), among others. This straightforward design allows for effortless disassembly, enabling both individual users and small workshops to optimize space while effectively planing sizable lumber slabs using the apparatus 100. Additionally, in the present embodiments, the height of the cutting tool 140 is adjusted manually by the user. In contrast, CNC machines utilize a combination of components to finely control the Z-axis movement. The present embodiments manage the precision within the Z-axis (e.g., vertical dimension) by alignment with the manufacturer's manual height adjustment for the cutting tool 140. In these embodiments, the user manually adjusts the height of the cutting tool 140, unlike CNC machines, which utilize various components to finely control Z-axis movement. Precision within the Z-axis is maintained by aligning with the manufacturer's manual height adjustment for the cutting tool 140, allowing resources to be optimized for specific needs without adding unnecessary complexity across multiple dimensions. Counterintuitively, this approach contrasts with other automated planing machines, like CNC machines, which prioritize achieving high precision across the X, Y, and Z axes through complex components, precise motor control, and computer-driven instructions.

Through the course of use, the cutting tool 140 of planing devices gradually loses its sharpness and necessitates replacement. In conventional machines like CNC machines, a dull cutting tool 140 exerted on the workpiece 145 can cause substantial tear-out, resulting in an aesthetically unpleasing appearance of the workpiece 145. In contrast, the present design counteracts these forces by allowing the rollers 130 to experience slippage as a preventive measure. Instead of mechanically forcing a dulled cutting tool 140 through the surface, the controller 165 manages the depth of the pass and opts for increasingly shallower passes. Additionally, the controller 165 may operate the apparatus 100 at a reduced speed to protect the surface finish from deterioration, ensuring a higher quality and more aesthetically pleasing result.

During operation, the controller 165 receives data such as the current of the plurality of actuators 160 and a duration of time it takes the bracket 135 to complete a pass, specifically the time elapsed as the bracket 135 travels from the first end of the workpiece 145 to the second end. The controller 165 monitors the electrical current consumption of the plurality of actuators 160. When the current is above a threshold or spiking, it indicates that the cutting tool 140 is struggling to remove material cleanly. In some embodiments, a current above a threshold indicates that the cutting tool 140 has dulled. Conversely, when the current is below a threshold, it indicates that not enough material is being removed from the workpiece 145. The controller 165 monitors the duration of each pass (e.g., the time taken for a forward pass or rearward pass). When the duration of a pass is below a threshold, it may indicate that the rollers 130 are losing traction due to the opposing force generated by the cut. This may indicate that the cutting tool 140 is dull or the surface of the workpiece 145 is uneven at the current operational settings.

By monitoring the data such as speed and duration, the controller 165 may adjust the parameters of the apparatus 100 to enhance the quality of the finish of the workpiece 145. This real-time adjustment capability ensures optimal performance and a superior finish by dynamically responding to the conditions detected during operation. Accordingly, the controller 165 may adjust the speed of the plurality of actuators 160 and modify the depth of the cutting tool 140 to achieve optimal performance. For example, if the controller 165 decreases the speed of the plurality of actuators 160, it may also reduce the depth of the cut, resulting in a longer but more precise pass. By fine-tuning these parameters, the controller 165 ensures that each pass is performed with the ideal balance of speed and cutting depth, enhancing the overall quality of the workpiece 145 finish.

By data analysis, the controller 165 may determine when the cutting tool 140 is dulling based on the parameters. In some embodiments, when the current of the actuator of the plurality of actuators 160 is greater than a threshold, an alert is transmitted to the device in the message center 308. In some embodiments, when the duration of time is greater than a threshold, an alert is transmitted to the device in the message center 308. The alert may indicate that the effectiveness of the cutting tool 140 has decreased and maintenance and/or replacement of the cutting tool 140 is needed.

During operation, while the cutting tool 140 is planing the workpiece 145, the apparatus 100 may become bogged down. This occurs when the apparatus 100 encounters resistance, causing it to struggle and slow down the cutting process. If not addressed, this can lead to several issues, including uneven surfaces, gouging of the workpiece 145, increased strain on the motor, overheating, or stalling. When bogging down occurs, the frequency of the actuator 160 shifts, leading to a noticeable change in sound. In other words, during normal operation, the actuator 160 produces a steady-state sound or pitch, indicating unburdened performance. However, when the cutting tool 140 slows down or becomes burdened, such as during bogging down, this steady-state sound changes. As a result, the present systems recognize this occurrence and utilizes it to send an alert when a deviation from the steady-state sound is detected.

By leveraging the microphone on the connected device, such as the mobile device, this change in frequency can be detected, triggering an alert in the app's message center 308. The user can then respond by adjusting the speed or stopping the apparatus 100. In some embodiments, these functions are controlled through the GUI 300 or manually via control switches on the apparatus 100. This functionality improves the quality of the finished workpiece 145, extends the lifespan of the apparatus 100, and prevents the cutting tool 140 from overheating and dulling prematurely.

Figure 13A:
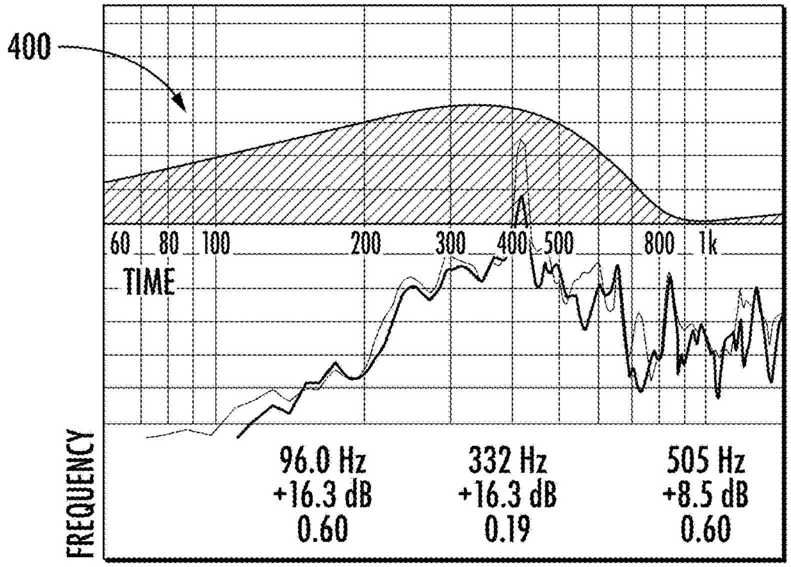
FIGS. 13A-13C are graphs illustrating the operational performance of the apparatus during use, in accordance with some embodiments.
Figure 13B:
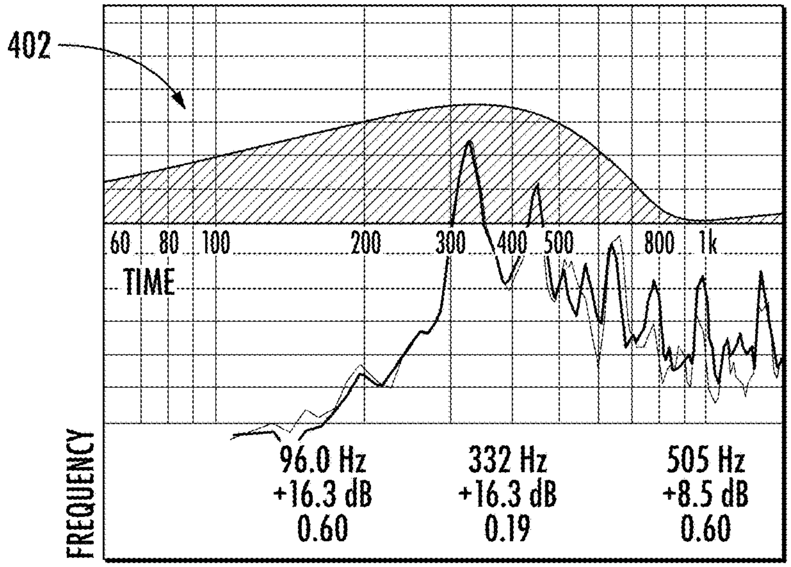
Figure 13C:
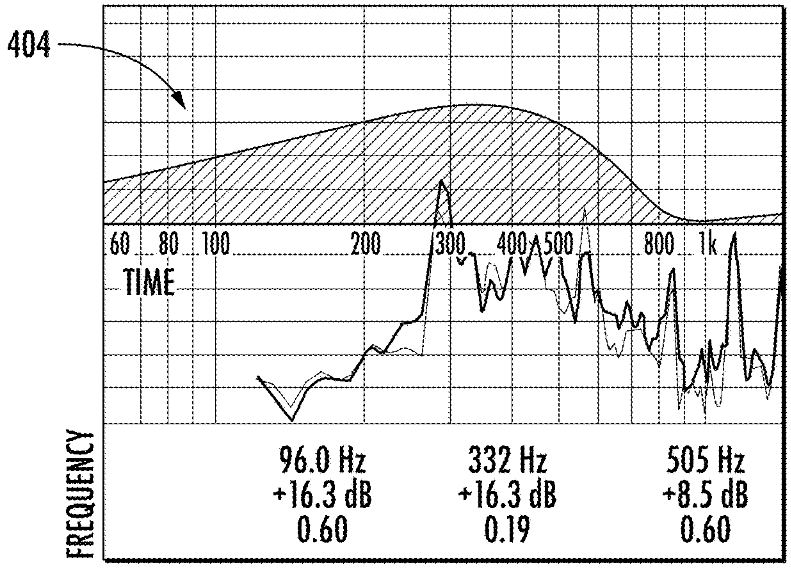

FIGS. 13A-13C are graphs illustrating the operational performance of the apparatus 100 during use, in accordance with some embodiments. The graphs depicted show frequency (Y-axis) versus time (X-axis) during operation of the apparatus 100. FIG. 13A shows graph 400 of the frequency during a normal non-cutting pass of the apparatus 100, such as during calibration. FIG. 13B shows graph 402 of the frequency during a normal cutting pass of the apparatus 100. FIG. 13C shows graph 404 of frequency during an overburden bogged down cutting pass of the apparatus 100. As shown, when the actuator 160 is unburdened the primary frequency of one embodiment of the actuator 160 is detected with a large spike in amplitude at 400 Hz (see FIG. 13A). When a normal cutting pass starts, the frequency shifts down to 330 Hz, but the amplitude remains largely unaffected (see FIG. 13B). After the cut progresses deeper and the actuator 160 becomes bogged down, the amplitude reduces and spreads across multiple frequencies (see FIG. 13C).

Figure 14:
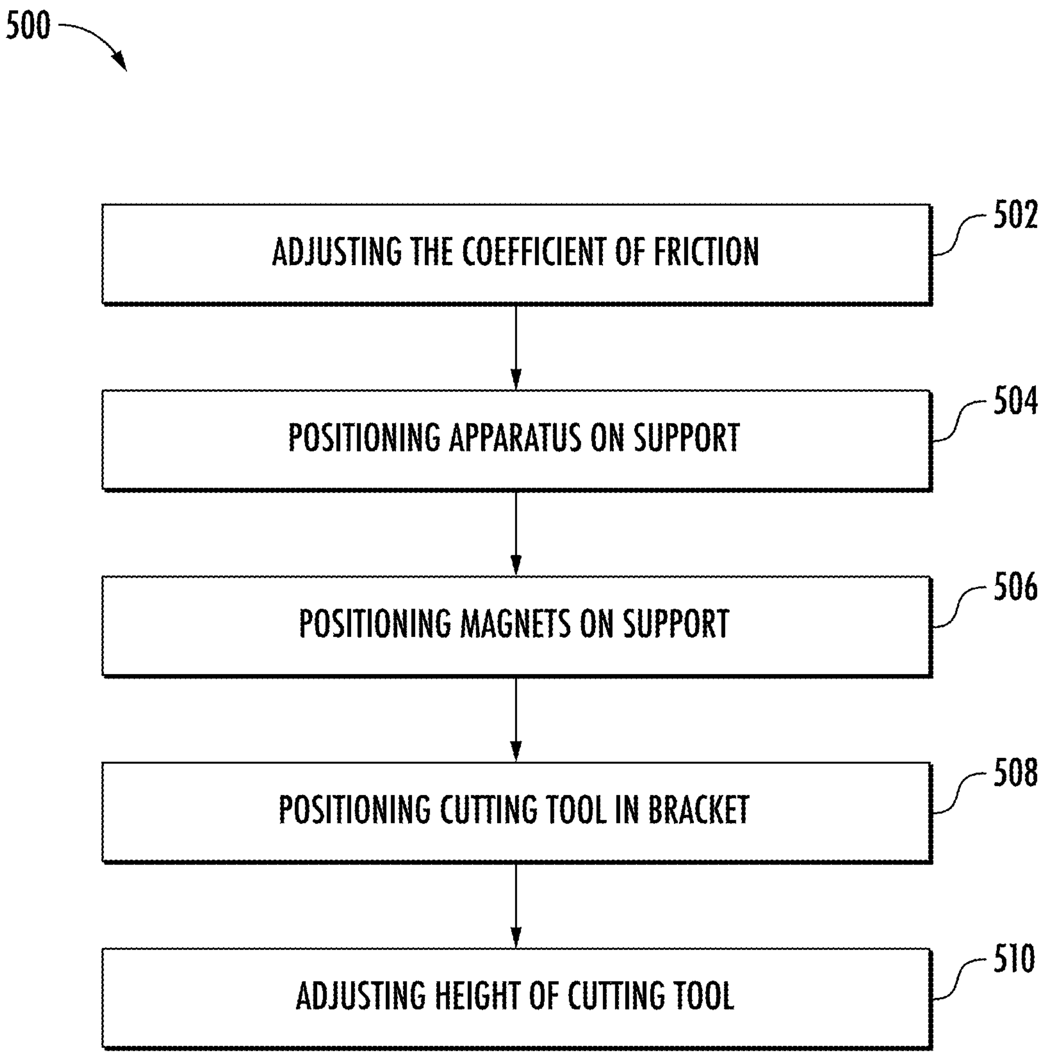
FIG. 14 is a flowchart for a method to setup the apparatus for planing a workpiece, in accordance with some embodiments.

FIG. 14 is a flowchart for a method to setup the apparatus 100 for planing a workpiece, in accordance with some embodiments. The particular steps, order of steps, and combination of steps are shown for illustrative and explanatory purposes only. Other embodiments can implement different particular steps, orders of steps, and combinations of steps to achieve similar functions or results. A method 500 begins at block 502 by adjusting the coefficient of friction of the plurality of rollers based on material properties of the workpiece. This involves selecting the plurality of rollers for the particular application. At block 504, the apparatus 100 is positioned on the support 132 with the workpiece in position for planing. The support 132 is provided by the user and may be flat lumber (e.g., two-by-four, two-by-six or two-by-eight boards) mounted on sawhorses. At block 506, end stops are positioned on each end of the support 132 to set the maximum travel of the apparatus 100 in the Y-axis. In some embodiments, magnets 170 are used to interact with the sensors 175, and serve as "end stops" for the apparatus 100 when traveling in the horizontal plane. At block 508, the cutting tool 140 is positioned in the bracket 135. At block 510, the height of the cutting tool 140 is manually adjusted. The apparatus 100 can be started manually or by the app on the device.

Figure 15:
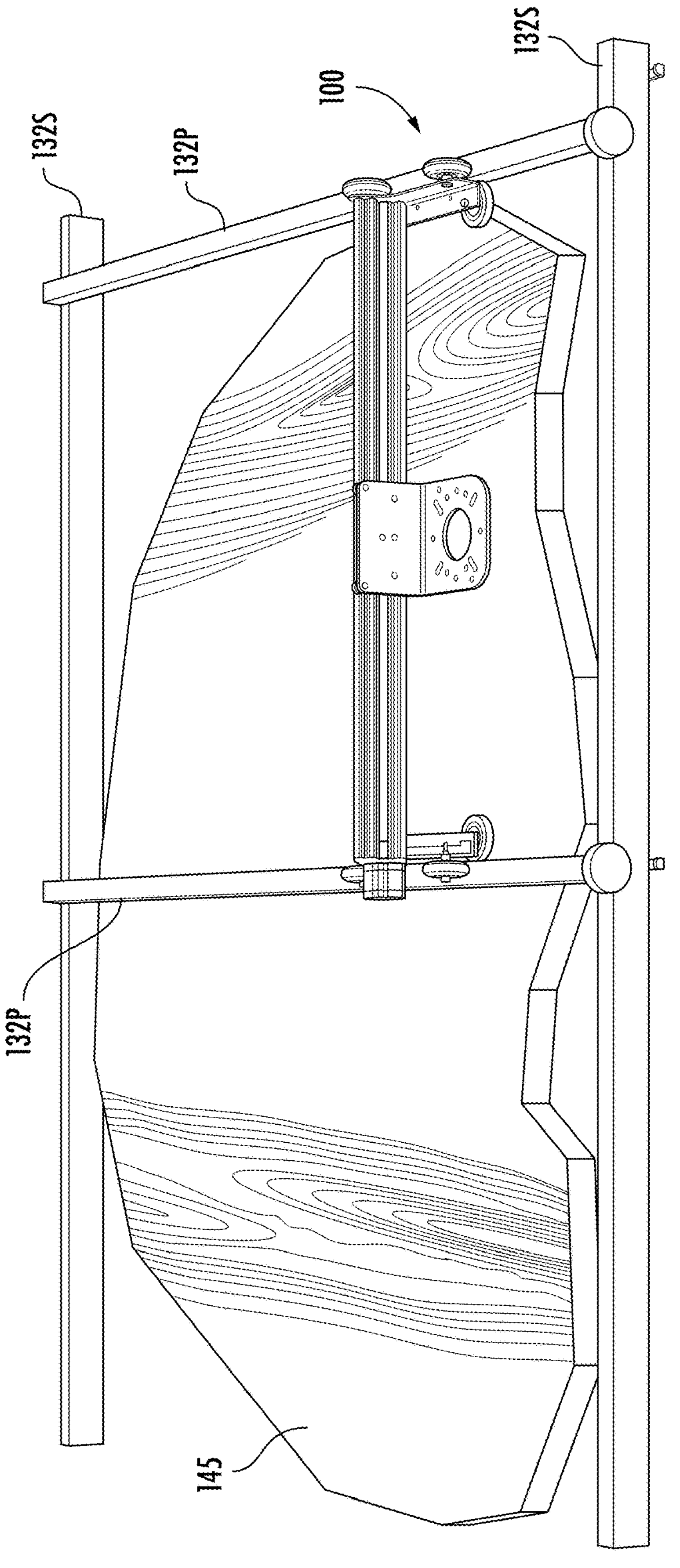
FIG. 15 is a perspective view of an apparatus on a primary support then a secondary support, in accordance with some embodiments.

FIG. 15 is a perspective view of an apparatus 100 on a primary support then a secondary support, in accordance with some embodiments. In some embodiments, the apparatus 100 is positioned on a primary support 132P, which is itself positioned on a secondary support 132S. This configuration allows the primary support 132P to move along the secondary support 132S. For example, after planing a first section of the workpiece 145, the primary support 132P, along with the apparatus 100, can be advanced along the secondary support 132S by an additional power source to plane the next section of the workpiece 145. This design eliminates the need to manually reposition the primary support for each new section of the workpiece 145, enabling the user to efficiently plane very large workpieces 145 in a home or small workshop setting. In some embodiments, the advancement of the primary support 132P along the secondary support 132S may be controlled by the GUI 300.

Figure 16:
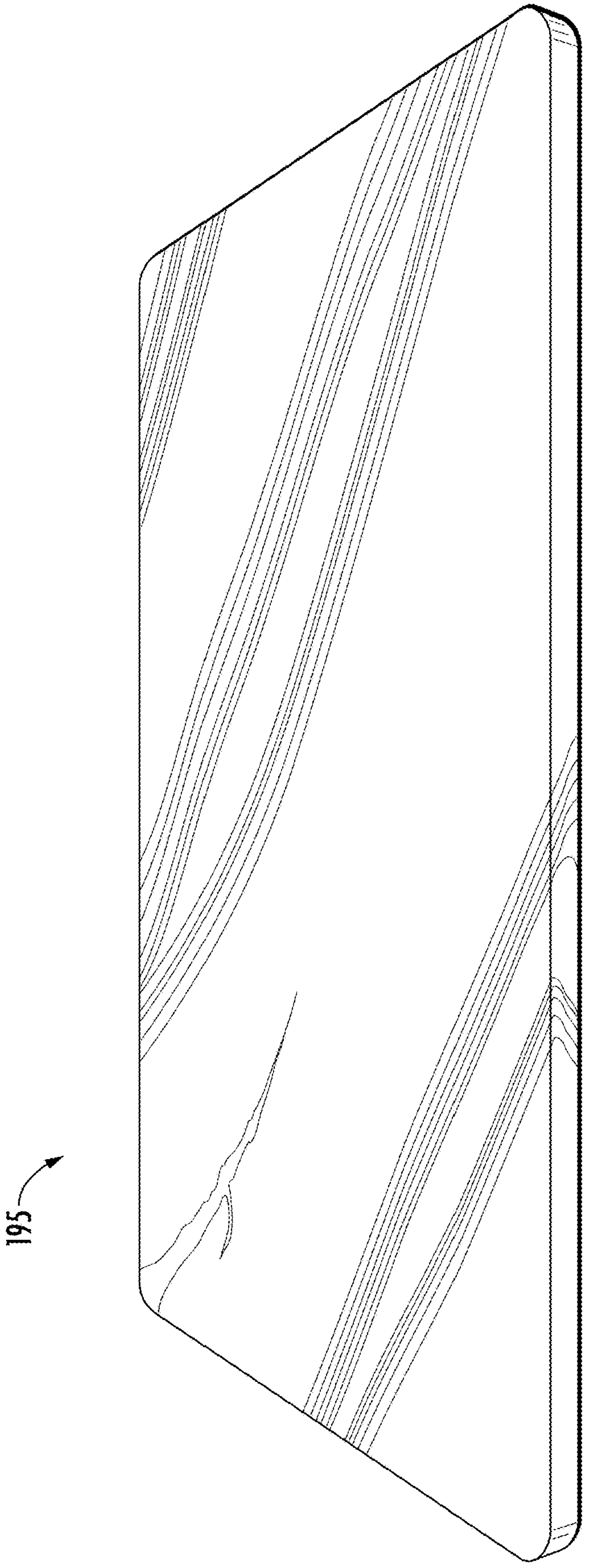
FIG. 16 is a perspective view of a completed project, in accordance with some embodiments.

FIG. 16 is a perspective view of a completed project, in accordance with some embodiments. Once the workpiece 145 has been planed, additional finishing processes can be performed to produce a completed project. These processes may include sanding to achieve a smooth surface, staining or painting for desired aesthetics, and applying a protective sealant to preserve the wood. These steps ensure that the workpiece 145 is transformed into a finished product, such as a table 195, that is not only functional but also visually appealing and durable.

Figure 17:
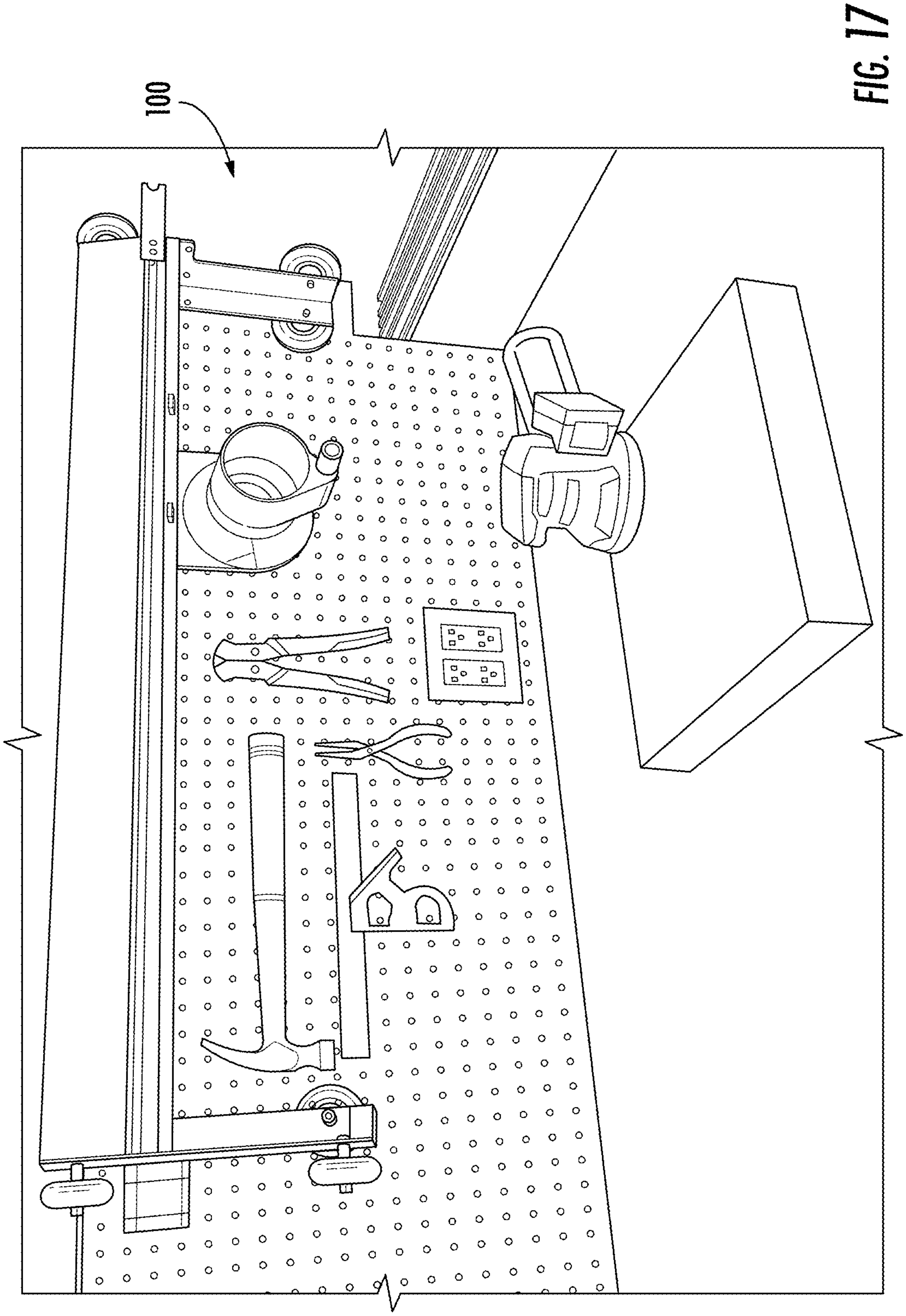
FIG. 17 is a perspective view of the apparatus suspended for storage, in accordance with some embodiments.

FIG. 17 is a perspective view of the apparatus 100 suspended on a wall for storage, in accordance with some embodiments. Support 132 are provided separately by the user and are not attached to the apparatus 100. The apparatus 100 is a compact, lightweight design that can be effortlessly lifted and maneuvered by a single user. This convenient feature allows for easy storage, such as suspending the apparatus 100 from a stanchion (not shown) coupled to the apparatus 100, on a wall, making it ideal for home use when space is limited. In some embodiments, the weight of the apparatus 100 is 19 lb to 21 lb, or 20 lb. In this way, a single user may lift and maneuver the apparatus 100. In some embodiments, the length of the carriage 105 along the X-axis may range from 18 inches to 48 inches. In some embodiments, the length of the first member 120 or the second member 125 along the Y-axis may range from 12 inches to 20 inches. Despite the increase in length along the X-axis, the compact design ensures the apparatus 100 can have a footprint as small as 12 inches by 8 inches when stored on the wall, even as the length of X-axis increases up to and beyond 48 inches.

Figure 18:
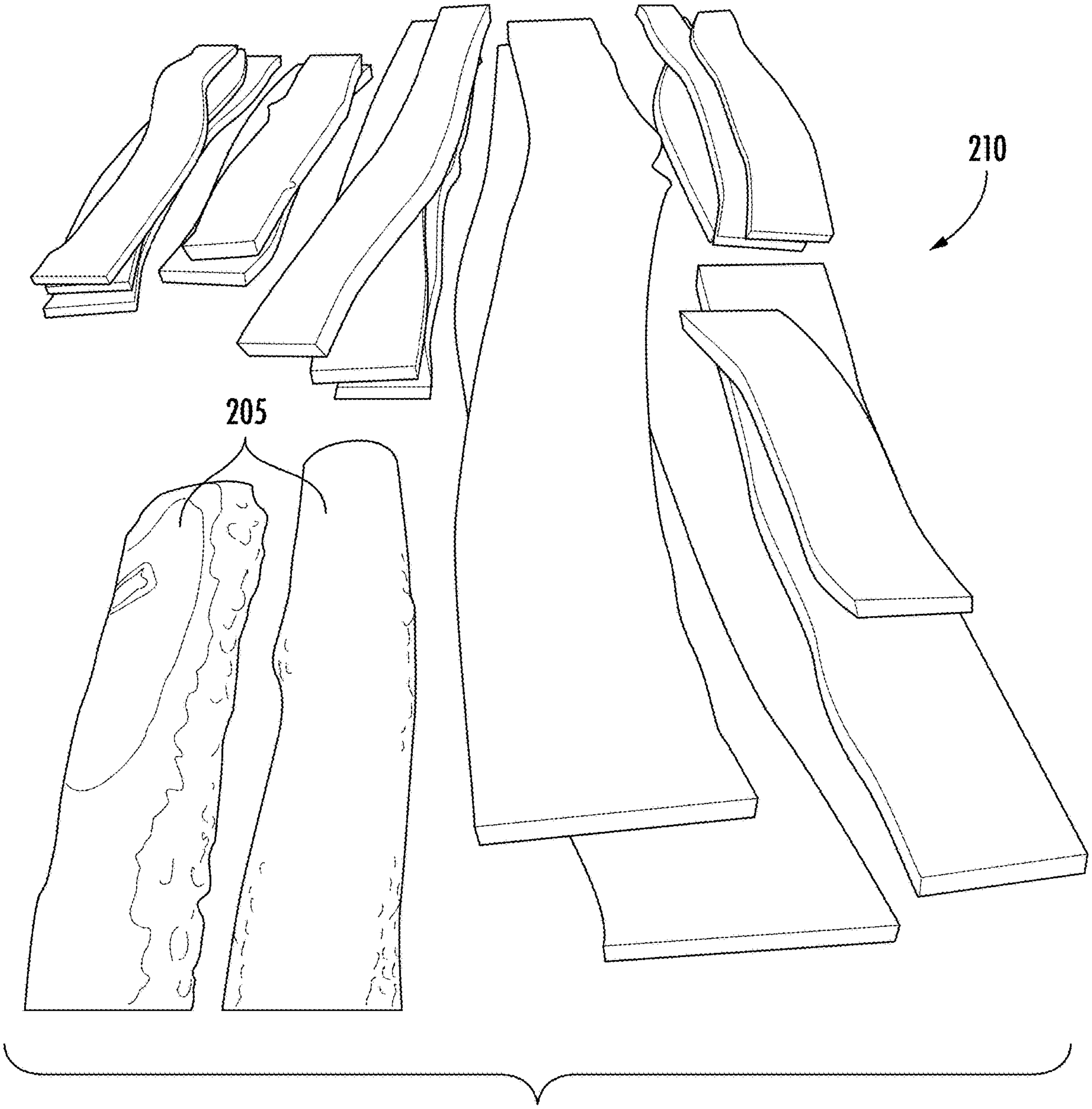
FIG. 18 is a perspective view of lumber, in accordance with some embodiments.

In some embodiments, the apparatus 100 is compatible with a range of tools other than a cutting tool 140, offering a multitude of functionalities. For example, the bracket 135 could be used to hold a sander for refining wood surfaces, a wire brush for a distinctive finish, or a saw blade for precision wood cutting of rough lumber. This versatility facilitates processes such as transforming a log into a refined showpiece. For example, FIG. 18 is a perspective view of lumber, in accordance with some embodiments. Rough lumber 205 may be cut (e.g., planed) with a saw blade in the bracket 135 of the apparatus 100 to produce boards 210.

In some embodiments, a camera with an optional light source may be used to facilitate automated, up-close inspection of the wood beneath the cutting tool 140. This enables the creation of a comprehensive map detailing the finish quality and intricate grain pattern. This real-time visual feedback empowers the apparatus 100 to make informed decisions regarding the optimal progression to the next cut or sanding.

In some aspects, an apparatus for planing is disclosed. The apparatus includes a carriage having a first end opposite a second end. A first member is coupled to the first end of the carriage opposite a second member coupled to the second end of the carriage. The first member and the second member each having a plurality of rollers positioned to freely roll along a support and move the carriage relative to the support. A first set of rollers of the plurality of rollers are positioned in a horizontal plane and a second set of rollers of the plurality of rollers are positioned in a vertical plane. A bracket is coupled to the carriage and configured to hold a cutting tool for contacting a workpiece. The bracket is configured to move along an X-axis and a Y-axis. A plurality of actuators is operatively connected to the bracket and configured to move the bracket along the X-axis and the Y-axis. Each sensor of a plurality of sensors is in communication with the controller and configured to generate signals comprising the position of the apparatus. A controller is configured to receive the signals from the plurality of sensors and data. The controller executes instructions for controlling the movement of the bracket based on the signals and the data.

In some aspects, each sensor of the plurality of sensors is positioned on the first member and configured to detect changes in a magnetic field strength caused by an interaction with a magnet coupled to a portion of the support. The controller controls the movement of the bracket in the horizontal plane based on the detected changes in the magnetic field strength.

In some aspects, a first sensor and a second sensor of the plurality of sensors are positioned on the first end of the carriage and the second end of the carriage respectively. The first sensor and the second sensor are configured to detect changes in a magnetic field strength caused by an interaction with a magnet coupled to the bracket, and the controller controls the movement of the bracket in the horizontal plane based on the detected changes in the magnetic field strength.

In some aspects, the plurality of rollers is configured to be replaceable with a second plurality of rollers that has a different material property and/or cross-sectional profile from the plurality of rollers. A coefficient of friction of the plurality of rollers is adjustable, such that a slip force is calibrated based on material properties of the workpiece. The slip force is a force required to overcome friction and initiate relative movement between the plurality of rollers and the support.

In some aspects, the data comprises an electrical current of each actuator of the plurality of actuators, a frequency of each actuator of the plurality of actuators, and a duration of time the bracket moves in the horizontal plane. The controller is configured to transmit an alert when the electrical current of the actuator of the plurality of actuators is greater than a threshold. The controller is configured to transmit an alert when the frequency of the actuator of the plurality of actuators changes from a steady state. The controller is configured to transmit an alert when the duration of time is greater than a threshold.

In some aspects, the bracket has a bottom surface, and the bottom surface of the bracket is aligned with a centerline the first set of rollers of the plurality of rollers in the horizontal plane during movement.

In some aspects, a distance between the bottom surface of the bracket and the workpiece is 0.5 mm to 30.77 mm during operation.

In some aspects, an apparatus for planing is disclosed. The apparatus includes a carriage. A bracket is slidably coupled to the carriage. The bracket is operatively connected to a plurality of actuators and configured to move along an X-axis and a Y-axis. A plurality of rollers is positioned to freely roll along a support and move the bracket relative to the support. A first set of rollers of the plurality of rollers are positioned in a horizontal plane and a second set of rollers of the plurality of rollers are positioned in a vertical plane. The plurality of rollers is configured to be replaceable with a second plurality of rollers that has a different material property and/or profile from the plurality of rollers. A controller is configured to execute instructions for controlling the movement of the bracket.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An apparatus for planing comprising:

a carriage having a first end opposite a second end;

a first member coupled to the first end of the carriage opposite a second member coupled to the second end of the carriage, the first member and the second member each having a plurality of rollers positioned to freely roll along a support and move the carriage relative to the support, a first set of rollers of the plurality of rollers are positioned in a horizontal plane and a second set of rollers of the plurality of rollers are positioned in a vertical plane;

a bracket coupled to the carriage and configured to hold a cutting tool for contacting a workpiece, the bracket configured to move along an X-axis and a Y-axis;

a plurality of actuators operatively connected to the bracket and configured to move the bracket along the X-axis and the Y-axis;

a plurality of sensors, each sensor configured to generate signals comprising a position of the apparatus; and a controller configured to receive the signals from the plurality of sensors and data, the controller executes instructions for controlling movement of the bracket based on the signals and the data.

2. The apparatus of claim 1 wherein each sensor of the plurality of sensors is positioned on the first member and configured to detect changes in a magnetic field strength caused by an interaction with a magnet coupled to a portion of the support, and the controller controls the movement of the bracket in the horizontal plane based on the detected changes in the magnetic field strength.

3. The apparatus of claim 1 wherein a first sensor and a second sensor of the plurality of sensors are positioned on the first end of the carriage and the second end of the carriage respectively, and configured to detect changes in a magnetic field strength caused by an interaction with a magnet coupled to the bracket, and the controller controls the movement of the bracket in the horizontal plane based on the detected changes in the magnetic field strength.

4. The apparatus of claim 1 wherein the plurality of rollers is configured to be replaceable with a second plurality of rollers that has a different material property and/or cross-sectional profile from the plurality of rollers.

5. The apparatus of claim 4 wherein a coefficient of friction of the plurality of rollers is adjustable, such that a slip force is calibrated based on material properties of the workpiece, the slip force being a force required to overcome friction and initiate relative movement between the plurality of rollers and the support.

6. The apparatus of claim 1 wherein the data comprises an electrical current of each actuator of the plurality of actuators, a frequency of each actuator of the plurality of actuators, and a duration of time the bracket moves in the horizontal plane.

7. The apparatus of claim 6 wherein the controller is configured to transmit an alert when the electrical current of the actuator of the plurality of actuators is greater than a threshold.

8. The apparatus of claim 6 wherein the controller is configured to transmit an alert when the frequency of the actuator of the plurality of actuators changes from a steady state.

9. The apparatus of claim 6 wherein the controller is configured to transmit an alert when the duration of time is greater than a threshold.

10. The apparatus of claim 1 wherein the bracket has a bottom surface, and the bottom surface of the bracket is aligned with a centerline the first set of rollers of the plurality of rollers in the horizontal plane during the movement, and a distance between the bottom surface of the bracket and the workpiece is 0.5 mm to 30.77 mm during operation.

11. An apparatus for planing comprising:

a carriage;

a bracket slidably coupled to the carriage, the bracket operatively connected to a plurality of actuators and configured to move along an X-axis and a Y-axis;

a plurality of rollers positioned to freely roll along a support and move the bracket relative to the support, a first set of rollers of the plurality of rollers are positioned in a horizontal plane and a second set of rollers of the plurality of rollers are positioned in a vertical plane, wherein the plurality of rollers is configured to be replaceable with a second plurality of rollers that has a different material property and/or cross-sectional profile from the plurality of rollers; and a controller configured to execute instructions for controlling movement of the bracket.

12. The apparatus of claim 11 wherein a coefficient of friction of the plurality of rollers is adjustable, such that a slip force is calibrated based on material properties of a workpiece, the slip force being a force required to overcome friction and initiate relative movement between the plurality of rollers and the support.

13. The apparatus of claim 11 further comprising:

a plurality of sensors, each sensor in communication with the controller and configured to generate signals comprising a position of the apparatus.

14. The apparatus of claim 13 wherein each sensor of the plurality of sensors is positioned on a first member, the first member coupled to a first end of the carriage, and configured to detect changes in a magnetic field strength caused by an interaction with a magnet coupled to a portion of the support, and the controller controls the movement of the bracket in the horizontal plane based on the detected changes in the magnetic field strength.

15. The apparatus of claim 13 wherein a first sensor and a second sensor of the plurality of sensors are positioned on a first end of the carriage and a second end of the carriage respectively, and configured to detect changes in a magnetic field strength caused by an interaction with a magnet coupled to the bracket, and the controller controls the movement of the bracket in the horizontal plane based on the detected changes in the magnetic field strength.

16. The apparatus of claim 11 wherein the controller executesthe instructions for controlling the movement of the bracket based on data, the data comprising an electrical current of each actuator of the plurality of actuators, a frequency of each actuator of the plurality of actuators, and a duration of time the bracket moves in the horizontal plane.

17. The apparatus of claim 16 wherein the controller is configured to transmit an alert when the electrical current of the actuator of the plurality of actuators is greater than a threshold.

18. The apparatus of claim 16 wherein the controller is configured to transmit an alert when the frequency of the actuator of the plurality of actuators changes from a steady state.

19. The apparatus of claim 16 wherein the controller is configured to transmit an alert when the duration of time is greater than a threshold.

20. The apparatus of claim 11 wherein the bracket has a bottom surface, and the bottom surface of the bracket is aligned with a centerline the first set of rollers of the plurality of rollers in the horizontal plane during theg movement, and a distance between the bottom surface of the bracket and a workpiece is 0.5 mm to 30.77 mm during operation.

* * * * *